(12) United States Patent
Park et al.

(10) Patent No.: US 11,720,194 B2
(45) Date of Patent: Aug. 8, 2023

(54) TOUCH DETECTION DEVICE AND DISPLAY DEVICE INCLUDING THE SAME

(71) Applicant: Samsung Display Co., Ltd., Yongin-Si (KR)

(72) Inventors: Jung Mok Park, Hwaseong-si (KR); Min Hong Kim, Hwaseong-si (KR); Tae Joon Kim, Seongnam-si (KR); Jin Woo Park, Yongin-si (KR); Wan Kee Jun, Anyang-si (KR); Hyun Wook Cho, Yongin-si (KR)

(73) Assignee: Samsung Display Co., Ltd., Yongin-Si (KR)

( * ) Notice: Subject to any disclaimer, the term of this patent is extended or adjusted under 35 U.S.C. 154(b) by 0 days.

(21) Appl. No.: 17/668,966

(22) Filed: Feb. 10, 2022

(65) Prior Publication Data

US 2023/0052993 A1    Feb. 16, 2023

(30) Foreign Application Priority Data

Aug. 11, 2021    (KR) .................. 10-2021-0106079

(51) Int. Cl.
*G06F 3/041* (2006.01)
*G06F 3/044* (2006.01)

(52) U.S. Cl.
CPC .......... *G06F 3/0412* (2013.01); *G06F 3/0446* (2019.05); *G06F 3/0448* (2019.05); *G06F 2203/04103* (2013.01); *G06F 2203/04111* (2013.01); *G06F 2203/04112* (2013.01)

(58) Field of Classification Search
CPC .... G06F 3/0412; G06F 3/0446; G06F 3/0448; G06F 2203/04103; G06F 2203/04111; G06F 2203/04112

See application file for complete search history.

(56) References Cited

U.S. PATENT DOCUMENTS

| | | | |
|---|---|---|---|
| 2010/0315353 A1 | 12/2010 | Huang et al. | |
| 2011/0242057 A1 | 10/2011 | Lee et al. | |
| 2017/0102808 A1* | 4/2017 | Goto | G02F 1/13338 |
| 2020/0091358 A1* | 3/2020 | Noh | G06F 3/044 |
| 2021/0200363 A1* | 7/2021 | Lee | H01L 27/323 |

* cited by examiner

*Primary Examiner* — Deeprose Subedi
(74) *Attorney, Agent, or Firm* — Innovation Counsel LLP

(57) ABSTRACT

The present disclosure relates to a touch detection device that can increase the emission efficiency while maintaining touch detecting performance by improving the structure of touch electrodes. According to an embodiment of the disclosure, a touch detection device comprising a first touch insulating layer, a connection electrode disposed on the first touch insulating layer, a second touch insulating layer disposed on the connection electrode, a driving electrode disposed on a second touch insulating layer and connected to the connection electrode through at least one touch contact hole, and a sensing electrode disposed on the second touch and spaced apart from the driving electrode, wherein at least one of the driving electrode and the sensing electrode a conductive metal electrode and a metal oxide electrode which is oxidized.

10 Claims, 20 Drawing Sheets

TOUCH DETECTION DEVICE AND DISPLAY DEVICE INCLUDING THE SAME

This application claims priority to Korean Patent Application No. 10-2021-0106079 filed on Aug. 11, 2021, in the Korean Intellectual Property Office, and all the benefits accruing therefrom under 35 U.S.C. 119, the contents of which in its entirety are herein incorporated by reference.

BACKGROUND

1. Field of the Disclosure

The present disclosure relates to a touch detection device, a display device comprising the same, and a method for fabricating the same.

2. Description of the Related Art

As an information-oriented society evolves, various demands for display devices are ever increasing. For example, a variety of electronic devices such as smart phones, digital cameras, laptop computers, navigation devices, and smart televisions is employing the display devices.

Among display devices, an organic light-emitting display device displays images by using an organic light-emitting element that emits light. Such an organic light-emitting display device has advantages in that it has fast response speed, high luminance and large viewing angle, and is driven with low power.

A display device such as an organic light-emitting display device includes a touch detector as one of input interfaces in order to detect a user's touch. The touch detector includes touch electrodes driven by capacitive sensing to detect a user's touch.

Previously, in order to reduce the reflection of external light caused by touch electrodes or the like, a polarizing plate is formed on an front surface of the display device or a color filter, a black matrix, etc. are additionally formed.

SUMMARY

Aspects of the present disclosure provide a touch detection device that can increase the emission efficiency while maintaining touch detecting performance by improving the structure of touch electrodes.

Aspects of the present disclosure also provide a simpler method of fabricating a touch detection device by employing an improved touch electrode structure that can replace a black matrix.

It should be noted that objects of the present disclosure are not limited to the above-mentioned object; and other objects of the present disclosure will be apparent to those skilled in the art from the following descriptions.

According to an embodiment of the disclosure, a touch detection device comprising a first touch insulating layer, a connection electrode disposed on the first touch insulating layer, a second touch insulating layer disposed on the connection electrode, a driving electrode disposed on the second touch insulating layer and connected to the connection electrode through at least one touch contact hole, and a sensing electrode disposed on the second touch insulating layer and spaced apart from the driving electrode, wherein at least one of the driving electrode and the sensing electrode includes a conductive metal electrode and a metal oxide electrode. The metal oxide electrode is oxidized.

In an embodiment, the metal oxide electrode is disposed on the conductive metal electrode, and wherein the metal oxide electrode include one of copper oxide (CuO) and chromium oxide (CrO) or an alloy thereof. The metal oxide electrode is blackened via to an oxidation process.

In an embodiment, the at least one of the driving electrode and the sensing electrode is formed in a mesh pattern not to overlap emission areas.

In an embodiment, the device further comprising a third touch insulating layer disposed on the driving electrode and the sensing electrode, and a color filter layer disposed on the third touch insulating layer to overlap the emission areas.

In an embodiment, a line width of the driving electrode is greater than line widths of the sensing electrode and the connection electrode.

In an embodiment, the driving electrode comprises: a signal electrode electrically connected to the connection electrode to receive a touch driving signal; and signal floating electrodes spaced apart from the signal electrode and maintained in a floating state.

In an embodiment, distances between the signal electrode and the transfer floating electrodes are uniform. transfer floating electrodes are formed in a square, rectangular, or a polygonal shape.

In an embodiment, line widths of the driving electrode and the sensing electrode are greater than a line width of the connection electrode, and the line width of the driving electrode is equal to or different from the line width of the sensing electrode.

In an embodiment, the sensing electrode comprises a transfer electrode for transferring a voltage equal to an amount of charges stored at touch nodes formed where the driving electrode or the connection electrode overlaps the sensing electrode, and transfer floating electrodes separated from the transfer electrode and maintained in a floating state.

In an embodiment, distances between the transfer electrode and the transfer floating electrodes are uniform. The transfer floating electrodes are formed in a square, rectangular, or a polygonal shape.

According to an embodiment of the disclosure, a display device comprising a display panel comprising a display area having pixels for displaying an image, a touch detector overlapping the display area and comprising a touch sensing area having touch electrodes, and a touch driver electrically connected to the touch electrodes, wherein the touch detector comprises a first touch insulating layer, a connection electrode disposed on the first touch insulating layer, a second touch insulating layer disposed on the connection electrode, a driving electrode disposed on the second touch insulating layer and connected to the connection electrode through at least one touch contact hole, and a sensing electrode disposed on the second touch insulating layer and spaced apart from the driving electrode, wherein at least one of the driving electrode and the sensing electrode includes a conductive metal electrode and a metal oxide electrode. The metal oxide electrode is oxidized.

According to an embodiment of the disclosure, a method of fabricating a touch detection device, the method comprising forming a first touch insulating layer on a substrate, forming connection electrodes on the first touch insulating layer, forming a second touch insulating layer on the connection electrodes, forming a plurality of touch contact holes in the second touch insulating layer, and forming driving electrodes and sensing electrodes on the second touch insulating layer in which the plurality of touch contact holes are formed, and oxidizing at least one of the driving electrodes and the sensing electrodes.

In an embodiment, the driving electrodes and the sensing electrodes are spaced a predetermined distance apart from each other, wherein the at least one of the driving electrodes and the sensing electrodes is formed in a mesh pattern not to overlap emission areas.

In an embodiment, the method further comprising forming a third touch insulating layer on the driving electrodes and the sensing electrodes, and forming a color filter layer on the third touch insulating layer to overlap the emission areas.

In an embodiment, the forming the driving electrodes and the sensing electrodes comprises forming a first conductive metal layer for forming conductive metal electrodes on the second touch insulating layer, forming a second conductive metal layer for forming a metal oxide electrode on the first conductive metal layer, forming a photoresist pattern by applying a photoresist layer on the second conductive metal layer and performing exposure and development using a mask, forming the driving electrodes and the sensing electrodes by etching the first conductive metal layer and the second conductive metal layer using the photoresist pattern as a mask.

In an embodiment, the metal oxide electrode comprises one of copper oxide (CuO) and chromium oxide (CrO) or an alloy thereof. The metal oxide electrode is blackened via an oxidation process.

In an embodiment, the forming the driving electrodes and the sensing electrodes further comprises placing a mask over the second conductive metal layer after applying the photoresist layer, wherein a width of a light-blocking pattern for forming at least one of the driving electrodes and the sensing electrodes in the mask is greater than a width of a light-blocking pattern for forming the connection electrodes in the mask.

In an embodiment, the forming the driving electrodes and the sensing electrodes further comprises placing a mask over the second conductive metal layer after applying the photoresist layer, wherein the mask includes a plurality of first light-blocking patterns for forming signal electrodes and a plurality of second light-blocking patterns for forming signal floating electrodes, wherein the driving electrodes include the signal electrodes and the plurality of signal floating electrodes spaced apart from the signal electrodes.

In an embodiment, the forming the driving electrodes and the sensing electrodes further comprises placing a mask over the second conductive metal layer after applying the photoresist layer, wherein the mask includes a plurality of first light-blocking patterns for forming transfer electrodes and a plurality of second light-blocking patterns for forming transfer floating electrodes, and wherein the sensing electrodes include the transfer electrodes and the plurality of transfer floating electrodes disposed spaced apart from the signal electrodes.

In an embodiment, the forming the driving electrodes and the sensing electrodes further comprises forming a first conductive metal layer for forming conductive metal electrodes on the second touch insulating layer comprising the plurality of touch contact holes, patterning the first conductive metal layer to form the conductive metal electrodes, forming a second conductive metal layer for forming a metal oxide electrode on the conductive metal electrodes, patterning the second conductive metal layer to form the metal oxide electrode on the conductive metal electrodes.

According to an embodiment of the present disclosure, the emission efficiency can be improved without compromising the touch detecting performance by way of improving the material and structure of touch electrodes. In addition, it is possible to simplify the process of fabricating the touch detection device by employing an improved touch electrode structure that can replace a black matrix.

It should be noted that effects of the present disclosure are not limited to those described above and other effects of the present disclosure will be apparent to those skilled in the art from the following descriptions.

BRIEF DESCRIPTION OF THE DRAWINGS

The above and other aspects and features of the present disclosure will become more apparent by describing in detail embodiments thereof with reference to the attached drawings, in which.

DETAILED DESCRIPTION OF THE EMBODIMENTS

The present inventive concept will now be described more fully hereinafter with reference to the accompanying drawings, in which embodiments of the inventive concept are shown. This inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

It will also be understood that when a layer is referred to as being "on" another layer or substrate, it can be directly on the other layer or substrate, or intervening layers may also be present. The same reference numbers indicate the same components throughout the specification.

It will be understood that, although the terms "first," "second," etc. may be used herein to describe various elements, these elements should not be limited by these terms. These terms are only used to distinguish one element from another element. For instance, a first element discussed below could be termed a second element without departing from the teachings of the present inventive concept. Similarly, the second element could also be termed the first element.

Each of the features of the various embodiments of the present disclosure may be combined or combined with each other, in part or in whole, and technically various interlocking and driving are possible. Each embodiment may be implemented independently of each other or may be implemented together in an association.

Hereinafter, embodiments of the present disclosure will be described in detail with reference to the accompanying drawings.

Figure 1:
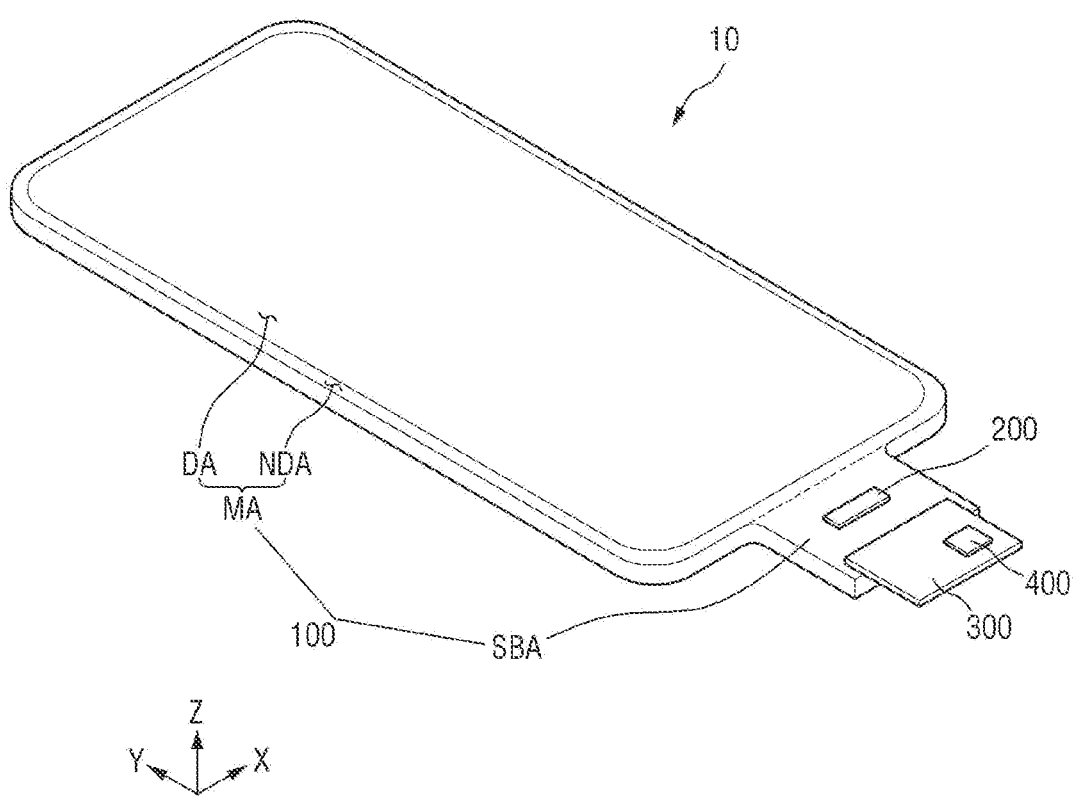
FIG. 1 is a perspective view of a display device according to an embodiment of the present disclosure.
Figure 2:
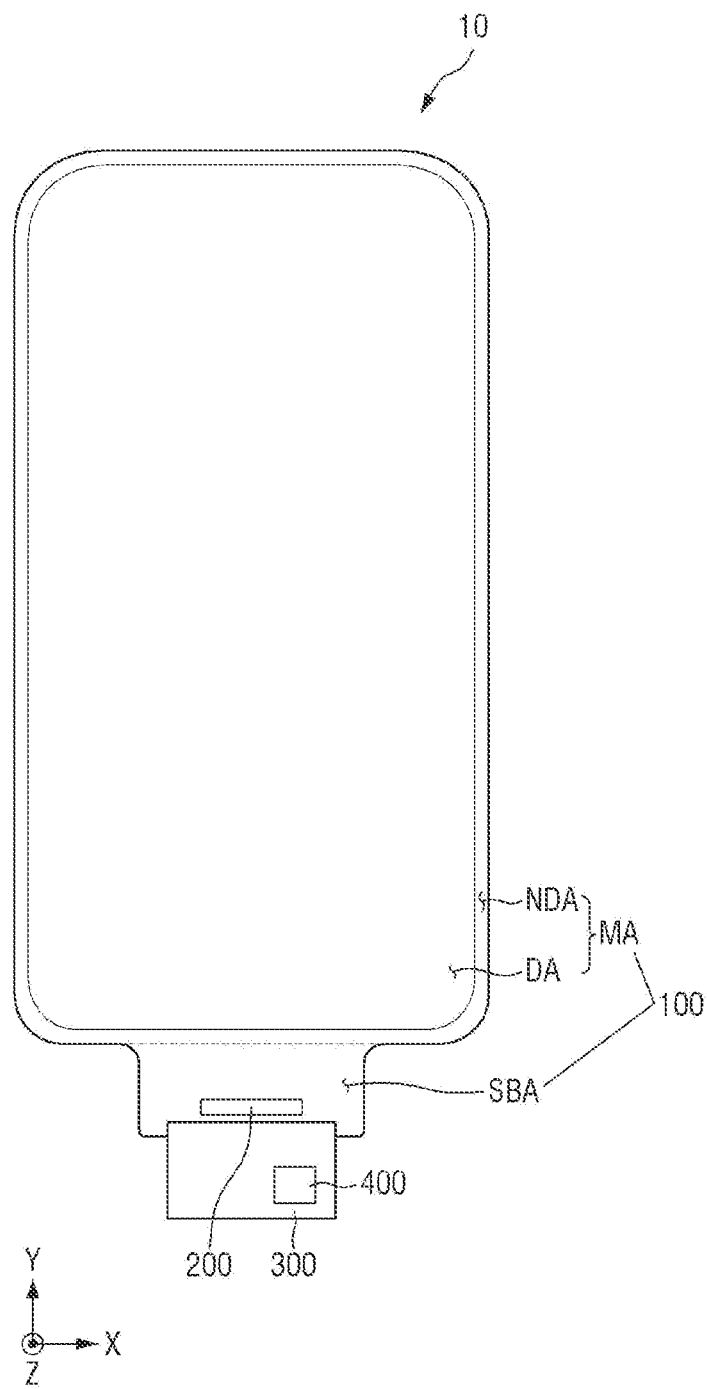
FIG. 2 is a plan view showing a display device according to an embodiment of the present disclosure.
Figure 3:
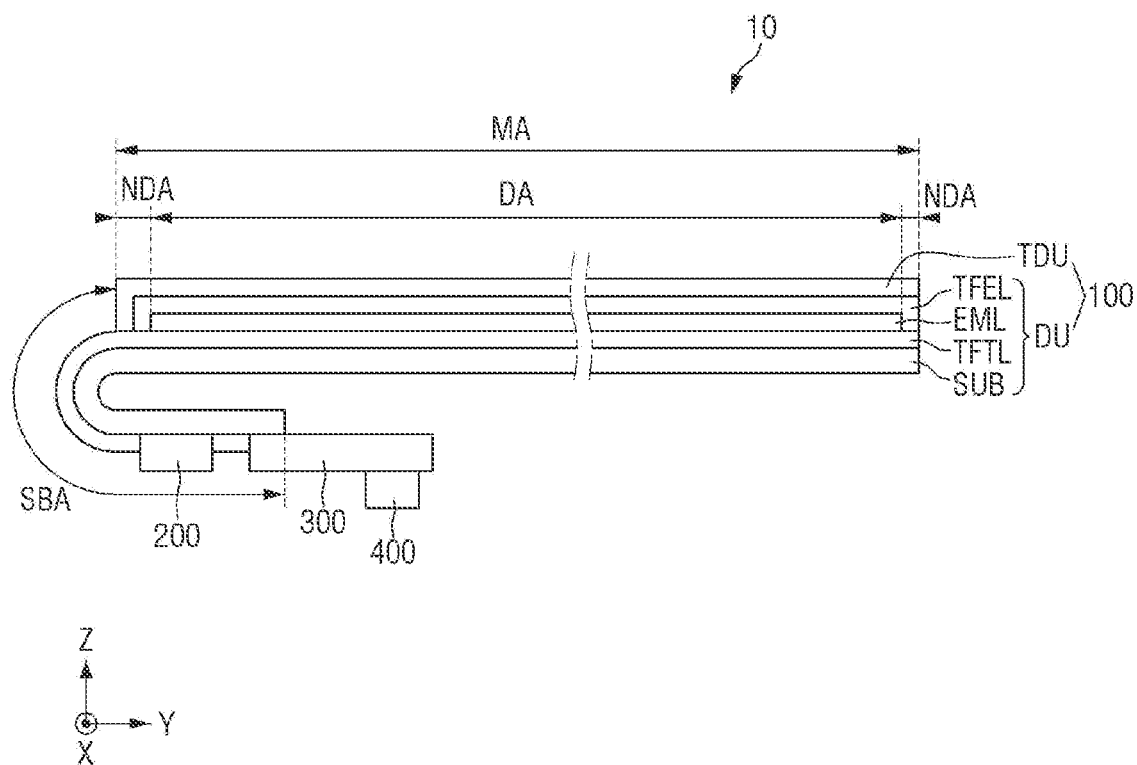
FIG. 3 is a view showing a side of a display device according to an embodiment of the present disclosure.

FIG. 1 is a perspective view of a display device according to an embodiment of the present disclosure. FIG. 2 is a plan view showing a display device according to an embodiment of the present disclosure. FIG. 3 is a view showing a side of a display device according to an embodiment of the present disclosure.

Referring to FIGS. 1 to 3, a display device 10 according to an embodiment of the present disclosure may be employed by portable electronic devices such as a mobile phone, a smart phone, a tablet PC, a mobile communications terminal, an electronic notebook, an electronic book, a portable multimedia player (PMP), a navigation device and a ultra mobile PC (UMPC). Alternatively, the display device 10 according to an embodiment of the present disclosure may be used as a display of a television, a laptop computer, a monitor, an electronic billboard, or the Internet of Things (IOT). Alternatively, the display device 10 according to the embodiment of the present disclosure may be applied to wearable devices such as a smart watch, a watch phone, a glasses-type display, and a head-mounted display (HMD) device. Alternatively, the display device 10 according to the embodiment may be used as a center information display (CID) disposed at the instrument cluster, the center fascia or the dashboard of a vehicle, as a room mirror display on the behalf of the side mirrors of a vehicle, as a display placed on the back of each of the front seats that is an entertainment system for passengers at the rear seats of a vehicle.

According to an embodiment of the present disclosure, the display device 10 may be a light-emitting display device such as an organic light-emitting display device using organic light-emitting diodes, a quantum-dot light-emitting display device including quantum-dot light-emitting layer, an inorganic light-emitting display device including an inorganic semiconductor, and a micro-LED display device using micro or nano light-emitting diodes (micro LEDs or nano LEDs). In the following description, an organic light-emitting display device is described as an example of the display device 10 according to the embodiment. It is, however, to be understood that the present disclosure is not limited thereto.

According to the embodiment of the present disclosure, the display device 10 includes a display panel 100, a display driver 200, a display circuit board 300 and a touch driver 400.

The display panel 100 may be formed in a rectangular plane shape having shorter sides in a first direction (x-axis direction) and longer sides in a second direction (y-axis direction) intersecting the first direction (x-axis direction). Each of the corners where the shorter sides in the first direction (x-axis direction) meet the longer sides in the second direction (y-axis direction) may be rounded with a predetermined curvature or may have a right angle. The shape of the display panel 100 in a plan view is not limited to a quadrangular shape, but may be formed in a different polygonal shape, a circular shape, or an elliptical shape. The display panel 100 may be formed flat, but a configuration of the display panel 100 is not limited thereto. For example, the display panel 100 includes curved portions formed at left and right ends and having a uniform curvature or a varying curvature. In addition, the display panel 100 may be formed to be flexible so that it can be curved, bent, folded or rolled.

The display panel 100 includes a main area MA and a subsidiary area SBA. The main area MA includes a display area DA where images are displayed and a non-display area NDA around the display area DA. The display area DA includes pixels for displaying images. The subsidiary area SBA may protrude from one side of the main area MA in the second direction (y-axis direction).

Although the subsidiary area SBA is unfolded in the example shown in FIGS. 1 and 2, the subsidiary area SBA may be bent as shown in FIG. 3, in which case it may be disposed on a rear surface of the display panel 100. When the subsidiary area SBA is bent, it may overlap the main area MA in the third direction (z-axis direction), which is the thickness direction of the substrate SUB. The display driver 200 may be disposed in the subsidiary area SBA.

In addition, as shown in FIG. 3, the display panel 100 includes a substrate SUB, a thin-film transistor layer TFTL, an emission material layer EML, an encapsulation layer TFEL, and a touch detector TDU.

The thin-film transistor layer TFTL may be disposed on the substrate SUB. The thin-film transistor layer TFTL may be disposed in the main area MA and the subsidiary area SBA. The thin-film transistor layer TFTL includes thin-film transistors.

The emission material layer EML may be disposed on the thin-film transistor layer TFTL. The emission material layer EML may be disposed in the display area DA of the main area MA. The emission material layer EML includes light-emitting elements disposed in emission areas.

The encapsulation layer TFEL may be disposed on the emission material layer EML. The encapsulation layer TFEL may be disposed in the display area DA and the non-display area NDA of the main area MA. The encapsulation layer TFEL includes at least one inorganic layer and at least one organic layer for encapsulating the emission material layer.

The touch detector TSU may be formed or disposed on the encapsulation layer TFEL. The touch detector TDU may be formed or disposed on the front surface of the main area MA, i.e., in the display area DA and the non-display area NDA. The touch detector TDU may sense a touch of a person or an object using sensor electrodes.

A cover window (not shown) for protecting the display panel 100 from above may be disposed on the touch detector TDU. The cover window may be attached on the touch detector TDU by a transparent adhesive such as an optically clear adhesive (OCA) layer and an optically clear resin (OCR). The cover window may be an inorganic material such as glass, or an organic material such as plastic and polymer material. In order to prevent deterioration of image visibility due to reflection of external light, a polarizing layer may be further disposed between the touch detector TDU and the cover window.

The display driver 200 may generate signals and voltages for driving the display panel 100. The display driver 200 may be implemented as an integrated circuit (IC) and may be attached to the display panel 10 by a chip on glass (COG) technique, a chip on plastic (COP) technique, or an ultrasonic bonding. It is, however, to be understood that the present disclosure is not limited thereto. For example, the display driver 200 may be attached on the display circuit board 300 by the chip-on-layer (COF) technique.

The display circuit board 300 may be attached to one end of the subsidiary area SBA of the display panel 100. Accordingly, the display circuit board 300 may be electrically connected to the display panel 100 and the display driver 200. The display panel 100 and the display driver 200 may receive digital video data, timing signals, and driving voltages through the display circuit board 300. The display circuit board 300 may be a flexible printed circuit board, a printed circuit board, or a flexible film such as a chip on film.

The touch driver 400 may be disposed on the display circuit board 300. The touch driver 400 may be implemented as an integrated circuit (IC) and may be attached on the display circuit board 300.

The touch driver 400 may be electrically connected to the touch electrodes of the touch detector TDU. The touch driver 400 applies touch driving signals to the touch electrodes of the touch detector TDU, and measures the amount of change in the mutual capacitance of each of the plurality of touch nodes formed by the touch electrodes. The touch driver 400 may determine whether there is a user's touch or near proximity based on the amount of a change in the mutual capacitance of each of the plurality of touch nodes. A user's touch refers to that an object such as the user's finger or a pen is brought into contact with a surface of the cover window disposed on the touch detector TDU. A user's near proximity refers to that an object such as the user's finger and a pen is hovering over a surface of the cover window.

As shown in FIGS. 1 to 3 and 6, in order to reduce reflection of external light by metal lines and metal electrodes of the display panel 100, the display panel 100 includes a color filter layer CFL including color filters. Accordingly, since it is not necessary to attach a separate anti-reflection member such as a polarizing plate on the display panel 100, the fabrication cost of the display device 10 can be reduced. In addition, by employing the color filter layer CFL without using a polarizing plate, it is possible to increase the luminance of the emitted light and the emission efficiency.

Figure 4:
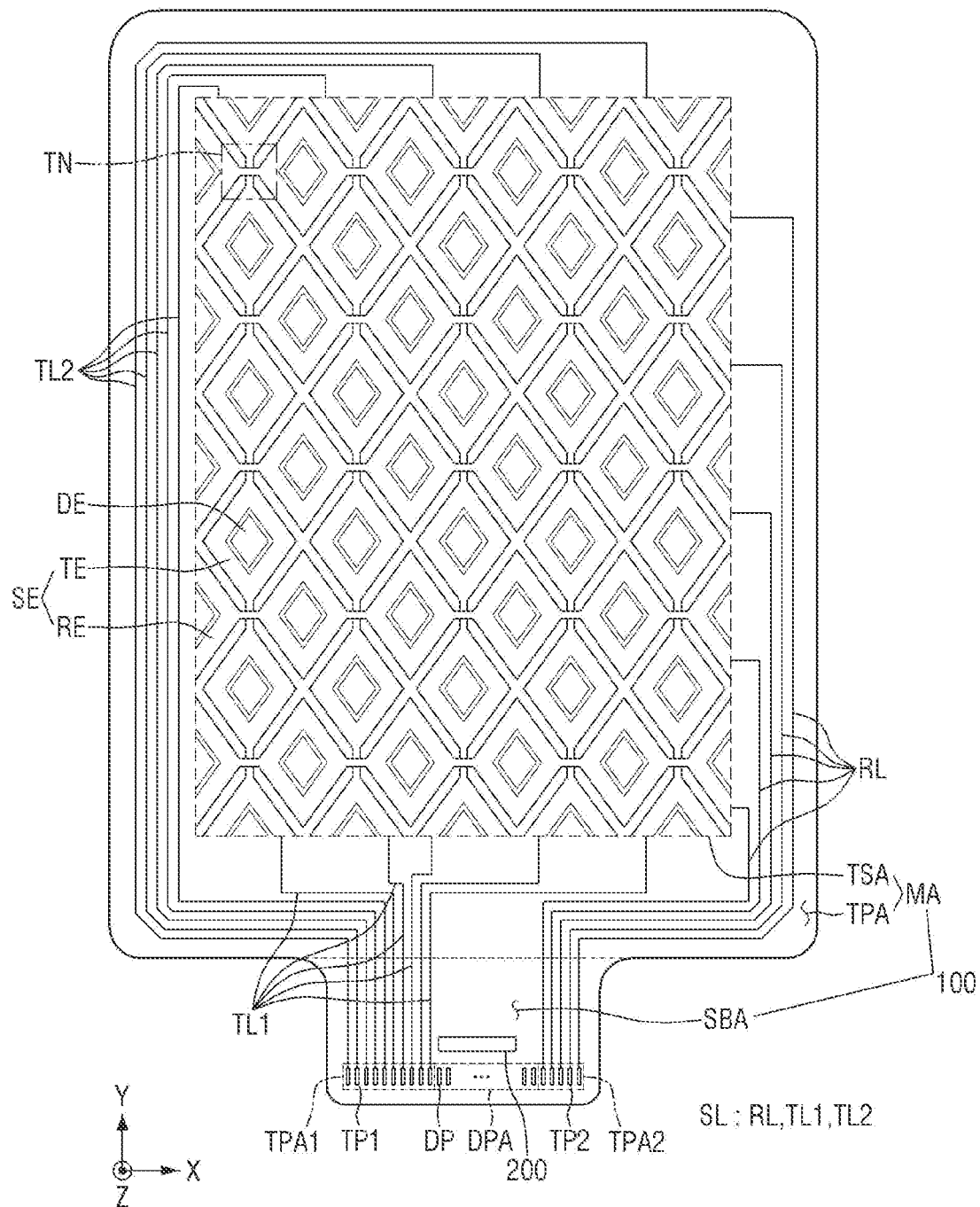
FIG. 4 is a layout diagram schematically showing an example of the touch detector of FIG. 3.

FIG. 4 is a layout diagram schematically showing an example of the touch detector of FIG. 3.

In the structure of the touch detector TDU shown in FIG. 4, the touch electrodes SE include two kinds of electrodes, e.g., driving electrodes TE and sensing electrodes RE. The touch detector TDU may be driven by mutual capacitance sensing, i.e., a touch driving signal is applied to the driving electrodes TE and then the amount of change in the mutual capacitance of each of the touch nodes is sensed through the sensing electrodes RE.

For convenience of illustration, FIG. 4 shows only the touch electrodes SE including the driving electrodes TE, the sensing electrodes RE, dummy patterns DE, touch lines TL1, TL2 and RL, and touch pads TP1 and TP2.

Referring to FIG. 4, the touch detector TDU includes a touch sensing area TSA for sensing a user's touch and a touch peripheral area TPA disposed around the touch sensing area TSA. The touch sensing area TSA may overlap the display area DA of FIGS. 1 to 3, and the touch peripheral area TPA may overlap the non-display area NDA of FIGS. 1 to 3.

The touch sensing area TSA includes the driving electrodes TE, the sensing electrodes RE and the dummy patterns DE. The driving electrodes TE and the sensing electrodes RE may be electrodes for forming mutual capacitance to sense a touch of an object or a person.

The sensing electrodes RE may be arranged in the first direction (x-axis direction) and second direction (y-axis direction). The sensing electrodes RE may be electrically connected to one another in the first direction (x-axis direction). The sensing electrodes RE adjacent to one another in the second direction (y-axis direction) may be electrically disconnected from one another. Accordingly, touch nodes TN where mutual capacitance is formed may be disposed at intersections of the driving electrodes TE and the sensing electrodes RE. A plurality of touch nodes TN may be regions corresponding to the intersections of the driving electrodes TE and the sensing electrodes RE, respectively.

Figure 5:
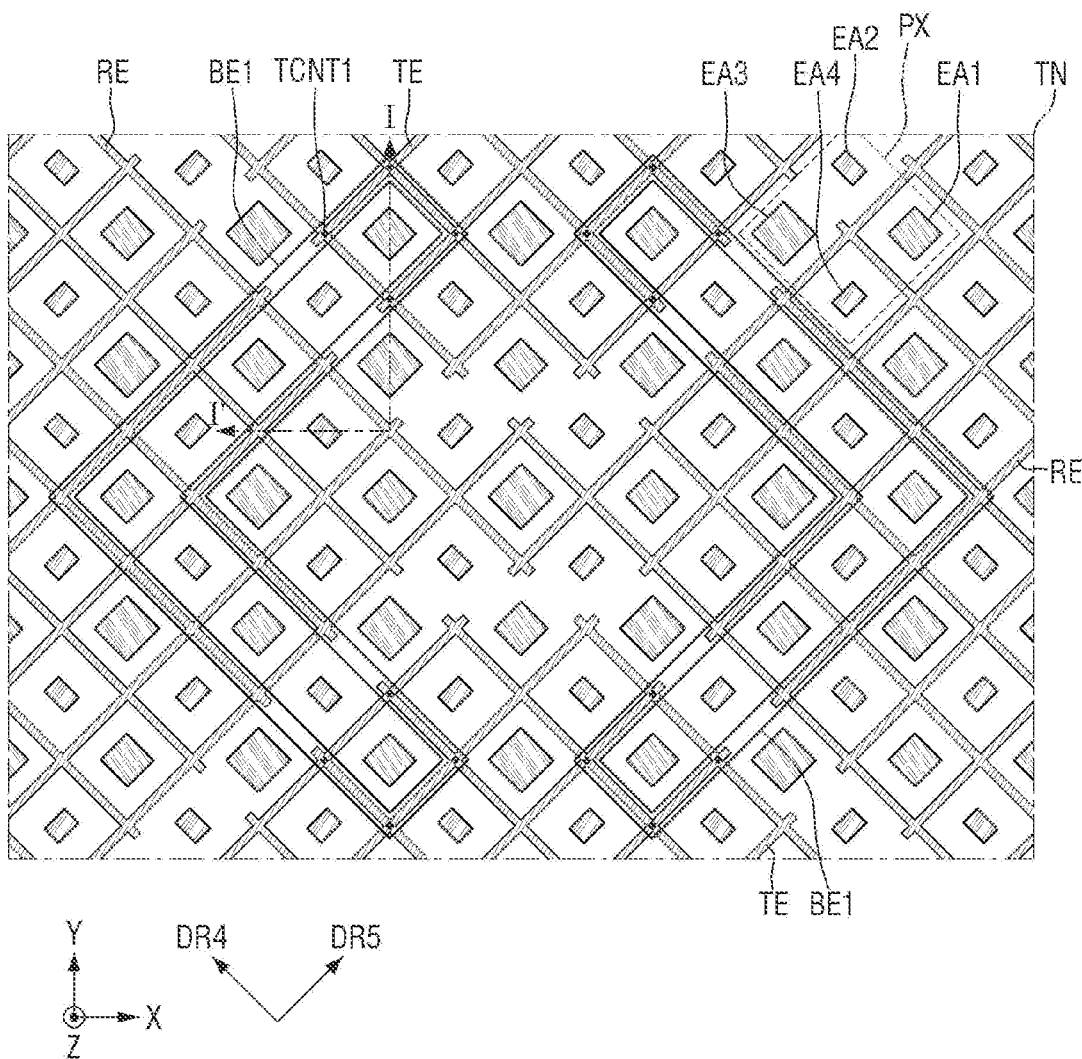
FIG. 5 is an enlarged plan view showing an example of the touch nodes of FIG. 4 in detail.

The driving electrodes TE may be arranged in the first direction (x-axis direction) and second direction (y-axis direction). The driving electrodes TE adjacent to one another in the first direction (x-axis direction) may be electrically separated from one another. The driving electrodes TE adjacent to one another in the second direction may be electrically connected to one another in the second direction (y-axis direction). The driving electrodes TE adjacent to one another in the second direction (y-axis direction) may be connected through connection electrodes BE1 as shown in FIG. 5.

Each of the dummy patterns DE may be surrounded by the driving electrode TE or the sensing electrode RE. Each of the dummy patterns DE may be electrically separated from the driving electrode TE and/or the sensing electrode RE. Each of the dummy patterns DE may be spaced apart from the driving electrode TE and/or the sensing electrode RE. Each of the dummy patterns DE may be electrically floating.

In FIG. 4, the driving electrodes TE, the sensing electrodes RE and the dummy patterns DE each have a diamond shape in a plan view, but the present disclosure is not limited thereto. For example, each of the driving electrodes TE, the sensing electrodes RE and the dummy patterns DE may have other quadrangular shape than a diamond, other polygonal shapes than a quadrangular shape, a circle or an ellipse in a plan view.

The touch lines TL1, TL2 and RL may be disposed in the sensor peripheral area TPA. The touch lines TL1, TL2 and RL include touch sensing lines RL connected to the sensing electrodes RE, and first touch driving lines TL1 and second touch driving lines TL2 connected to the driving electrodes TE.

The sensing electrodes RE disposed on one side of the touch sensing area TSA may be connected to the touch sensing lines RL, respectively. For example, some of the sensing electrodes RE electrically connected in the first direction (x-axis direction) that are disposed at the right end may be connected to the touch sensing lines RL as shown in FIG. 4. The touch sensing lines RL may be connected to second sensor pads TP2, respectively. Thus, the touch driver 400 may be electrically connected to the sensing electrodes RE.

The driving electrodes TE disposed at one end of the touch sensing area TSA may be connected to the first driving lines TL1, respectively, while the driving electrodes TE disposed at the opposite end of the touch sensing area TSA may be connected to the second driving lines TL2, respectively. For example, some of the driving electrodes TE electrically connected to one another in the second direction (y-axis direction) at the lower end may be connected to the first touch driving line TL1, while some of the driving electrodes TE disposed at the upper end may be connected to the second touch driving line TL2, as shown in FIG. 4. The second touch driving lines TL2 may be extended around the left side of the touch sensing area TSA and connected to the driving electrodes TE on the upper side of the touch sensing area TSA.

The first touch driving lines TL1 and the second touch driving lines TL2 may be connected to the first sensor pads TP1, respectively. Thus, the touch driver 400 may be electrically connected to the driving electrodes TE. The driving electrodes TE are connected to the driving lines TL1 and TL2 on both sides of the touch sensing area TSA, and receive the touch driving signals. Therefore, it is possible to prevent a difference between the touch driving signals applied to the driving electrodes TE disposed on the lower side of the touch sensing area TSA and the touch driving signals applied to the driving electrodes TE disposed on the upper side of the touch sensing area TSA which occurs due to the RC delay of the touch driving signals.

A first touch pad area TPA1 in which the first touch pads TP1 are disposed may be arranged on one side of a display pad area DP in which the display pads DPA are disposed. A second touch pad area TPA2 in which the second touch pads TP2 are disposed may be disposed on the opposite side of the display pad area DPA. The display pads DP may be electrically connected to data lines of the display panel 100.

The display pad area DPA, the first touch pad area TPA1 and the second touch pad area TPA2 may correspond to the pads of the display panel 100 connected to the display circuit board 300 shown in FIG. 2. The display circuit board 300 may be disposed on the display pads DP, the first touch pads TP1, and the second touch pads TP2. The display pads DP, the first touch pads TP1 and the second touch pads TP2 may be electrically connected to the display circuit board 300 using a low-resistance, high-reliability material such as an anisotropic conductive layer and a SAP. Therefore, the display pads DP, the first touch pads TP1 and the second touch pads TP2 may be electrically connected to the touch driver 400 disposed on the display circuit board 300.

FIG. 5 is an enlarged plan view showing an example of the touch nodes of FIG. 4 in detail.

Referring to FIG. 5, the touch nodes TN may be defined as the intersections of the driving electrodes TE and the sensing electrodes RE.

The driving electrodes TE and the sensing electrodes RE are disposed on the same layer and thus they may be spaced apart from each other. That is to say, there may be a gap between adjacent ones of the driving electrodes TE and the sensing electrodes RE.

In addition, the dummy patterns DE may also be disposed on the same layer as the driving electrodes TE and the sensing electrodes RE. That is to say, there may be a gap between adjacent ones of the driving electrodes TE and the dummy patterns DE and between adjacent ones of the sensing electrodes RE and the dummy patterns DE.

The connection electrodes BE1 may be disposed on a different layer from the driving electrodes TE and the sensing electrodes RE. Each of the connection electrodes BE1 may be bent at least once.

Although the connection electrodes BE1 have the shape of angle brackets "<" or ">" in the example shown in FIG. 5, the shape of the connection electrodes BE1 in a plan view is not limited thereto. Since the driving electrodes TE adjacent to each other in the second direction (y-axis direction) are connected by the plurality of connection electrodes BE1, even if any of the connection electrodes BE1 is disconnected, the driving electrodes TE can still be stably connected with each other. Although two adjacent ones of the driving electrodes TE are connected by two connection electrodes BE1 in the example shown in FIG. 5, the number of connection electrodes BE1 is not limited to two.

The connection electrodes BE1 may overlap the driving electrodes TE adjacent to one another in the second direction (y-axis direction) in the third direction (z-axis direction), which is the thickness direction of the substrate SUB. The connection electrodes BE1 may overlap the sensing electrodes RE in the third direction (z-axis direction). One side of each of the connection electrodes BE1 may be connected to one of the driving electrodes TE adjacent to each other in the second direction (y-axis direction) through touch contact holes TCNT1. The other side of each of the connection electrodes BE1 may be connected to another one of the driving electrodes TE adjacent to each other in the second direction (y-axis direction) through touch contact holes TCNT1.

The driving electrodes TE and the sensing electrodes RE may be electrically separated from each other at their intersections by a touch insulating layer interposed between the connection electrodes BE1 and the driving electrodes TE and the sensing electrodes RE. Accordingly, mutual capacitance can be formed between the driving electrodes TE and the sensing electrodes RE.

Each of the driving electrodes TE, the sensing electrodes RE and the connection electrodes BE1 may have a mesh structure or a net structure in a plan view. In addition, each of the dummy patterns DE may have a shape of a mesh structure or a net structure in a plan view. Accordingly, the driving electrodes TE, the sensing electrodes RE, the connection electrodes BE1 and the dummy patterns DE may not overlap with the emission areas EA1, EA2, EA3 and EA4 of each of the pixels PX. Therefore, it is possible to prevent the luminance of the lights emitted from the emission areas EA1, EA2, EA3 and EA4 from being lowered, which may occur as the lights are blocked by the driving electrodes TE, the sensing electrodes RE, the connection electrodes BE1 and the dummy patterns DE.

Each of the pixels PX includes a first emission area EA1 that emits light of a first color, a second emission area EA2 that emits light of a second color, a third emission area EA3 that emits light of a third color, and a fourth emission area EA4 that emits light of the second color. For example, the first color may be red, the second color may be green, and the third color may be blue. Alternatively, the first and third emission areas EA1 and EA3 may emit green light which is light of the second color, the second emission area EA2 may emit red light which is light of the first color, and the fourth emission area EA4 may emit blue light which is light of the third color.

In each of the pixels PX, the first emission area EA1 and second emission area EA2 may be adjacent to each other in a fourth direction DR4, and the third emission area EA3 and the fourth emission area EA4 may be adjacent to each other in the fourth direction DR4. In each of the pixels PX, the first emission area EA1 and fourth emission area EA4 may be adjacent to each other in a fifth direction DR5, and the second emission area EA2 and the third emission area EA3 may be adjacent to each other in the fifth direction DR5.

Each of the first emission area EA1, the second emission area EA2, the third emission area EA3 and the fourth emission area EA4 may have, but is not limited to, a diamond or a rectangular shape in a plan view. Each of the first emission area EA1, the second emission area EA2, the third emission area EA3 and the fourth emission area EA4 may have other polygonal shape than a quadrangular shape, a circular shape, or an elliptical shape in a plan view. In addition, although the third emission area EA3 is the largest while the second emission area EA2 and the fourth emission area EA4 are the smallest in the example shown in FIG. 5, the present disclosure is not limited thereto.

The second emission areas EA2 and the fourth emission areas EA4 may be arranged in odd numbered rows. The second emission areas EA2 and the fourth emission areas EA4 may be arranged side by side in each of the odd numbered rows in the first direction (x-axis direction). The second emission areas EA2 and the fourth emission areas EA4 may be arranged alternately in odd numbered rows. Each of the second emission areas EA2 may have shorter sides in the fourth direction DR4 and longer sides in the fifth direction DR5, while each of the fourth emission areas EA4 may have longer sides in the fifth direction DR5 and shorter sides in the fourth direction DR4. The fifth direction DR5 may refer to the direction between the first direction (x-axis direction) and the second direction (y-axis direction), which is inclined from the first direction (x-axis direction) by forty-five degrees. The fourth direction DR4 may be a direction perpendicular to the fifth direction DR5.

The first emission areas EA1 and the third emission areas EA3 may be arranged in even numbered rows. The first emission areas EA1 and the third emission areas EA3 may be arranged side by side in each of the even numbered rows in the first direction (x-axis direction). The first emission areas EA1 and the third emission areas EA3 may be alternately arranged in each of the even numbered rows.

The second emission areas EA2 and the fourth emission areas EA4 may be arranged in odd numbered columns. The second emission areas EA2 and the fourth emission areas EA4 may be arranged side by side in each of the odd numbered columns in the second direction (y-axis direction). The second emission areas EA2 and the fourth emission areas EA4 may be arranged alternately in each of the odd numbered columns.

The first emission areas EA1 and the third emission areas EA3 may be arranged in even numbered columns. The first emission areas EA1 and the third emission areas EA3 may be arranged side by side in each of the even numbered columns in the second direction (y-axis direction). The first emission areas EA1 and the third emission areas EA3 may be alternately arranged in each of the even numbered columns.

Figure 6:
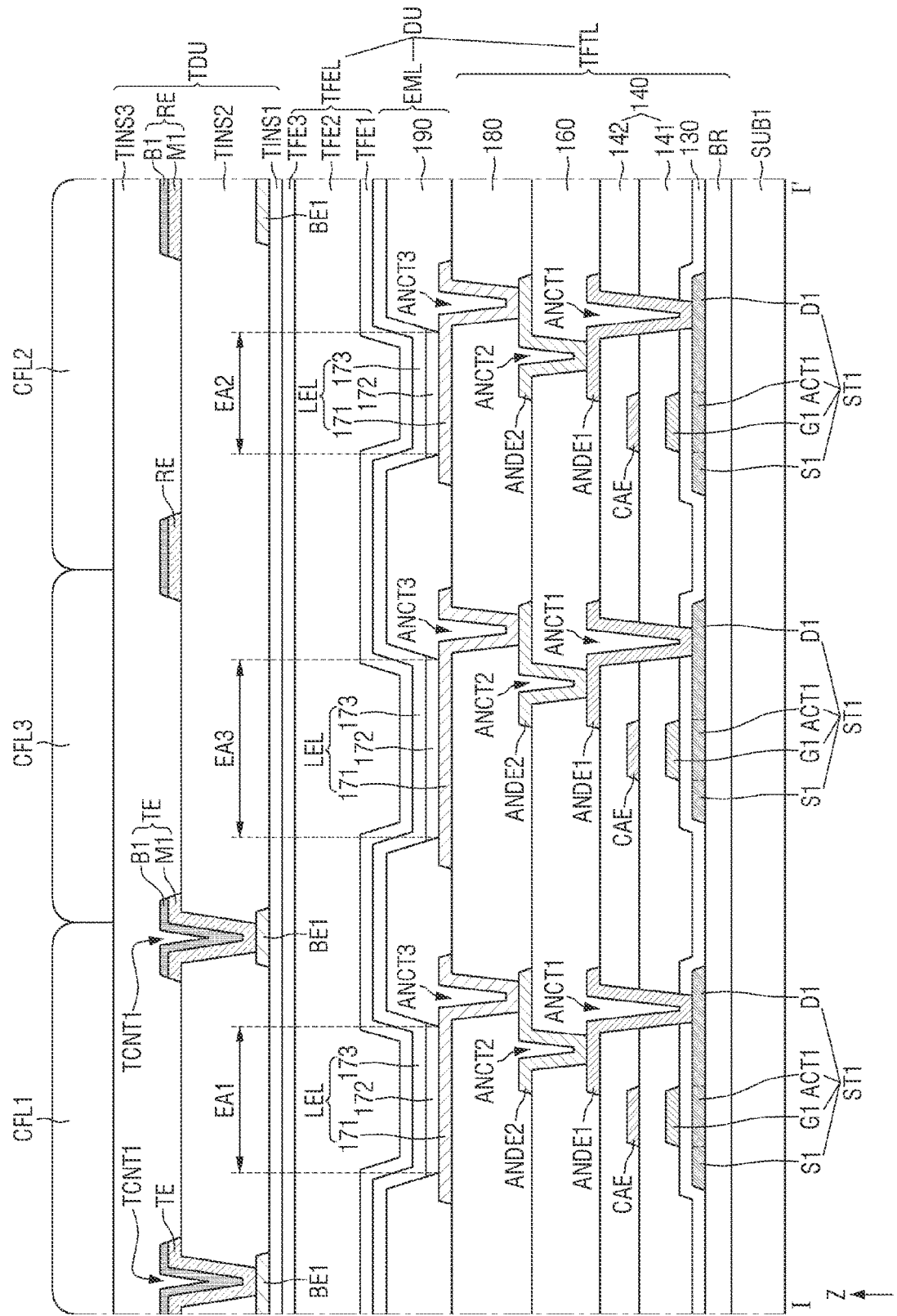
FIG. 6 is a cross-sectional view showing an example of the display panel taken along line I-I' of FIG. 5.

FIG. 6 is a cross-sectional view showing an example of the display panel taken along line I-I' of FIG. 5.

Referring to FIG. 6, a barrier layer BR may be disposed on the substrate SUB1. The substrate SUB1 may include an insulating material such as a polymer resin. For example, the substrate SUB may include polyimide. The substrate SUB1 may be a flexible substrate that can be bent, folded, or rolled.

The barrier layer BR is a layer for protecting the thin-film transistors of the thin-film transistor layer TFTL and an emissive layer 172 of the emission material layer EML. The barrier layer BR may include multiple inorganic layers stacked on one another alternately. For example, the barrier layer BR may include multiple layers in which one or more inorganic layers of a silicon nitride layer, a silicon oxynitride layer, a silicon oxide layer, a titanium oxide layer and an aluminum oxide layer are alternately stacked on one another.

Thin-film transistors ST1 may be disposed on the barrier layer BR. Each of the thin-film transistors ST1 includes an active layer ACT1, a gate electrode G1, a source electrode S1, and a drain electrode D1.

The active layer ACT1, the source electrode S1 and the drain electrode D1 of each of the thin-film transistors ST1 may be disposed on the barrier layer BR. The active layer ACT1 of each of the thin-film transistors ST1 includes polycrystalline silicon, single crystalline silicon, low-temperature polycrystalline silicon, amorphous silicon, or an oxide semiconductor. A part of the active layer ACT1 overlapping the gate electrode G1 in the third direction (z-axis direction) that is the thickness direction of the substrate SUB1 may be defined as a channel region. The source electrode S1 and the drain electrode D1 are regions that do not overlap with the gate electrode G1 in the third direction (z-axis direction) and may have conductivity by doping ions or impurities into a silicon semiconductor or an oxide semiconductor.

A gate insulator 130 may be disposed on the active layer ACT1, the source electrode S1 and the drain electrode D1 of each of the thin-film transistors ST1. The gate insulator 130 may include an inorganic layer, for example, a silicon nitride layer, a silicon oxynitride layer, a silicon oxide layer, a titanium oxide layer, or an aluminum oxide layer.

The gate electrode G1 of each of the thin-film transistors ST1 may be disposed on the gate insulator 130. The gate electrode G1 may overlap the active layer ACT1 in the third direction (z-axis direction). The gate electrode G1 may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

A first interlayer dielectric layer 141 may be disposed on the gate electrode G1 of each of the thin-film transistors ST1. The first interlayer dielectric layer 141 may include an inorganic layer, for example, a silicon nitride layer, a silicon oxynitride layer, a silicon oxide layer, a titanium oxide layer, or an aluminum oxide layer. The first interlayer dielectric layer 141 may include a plurality of inorganic layers.

A capacitor electrode CAE may be disposed on the first interlayer dielectric layer 141. The capacitor electrode CAE may overlap the gate electrode G1 of the first thin-film transistor ST1 in the third direction (z-axis direction). Since the first interlayer dielectric layer 141 has a predetermined dielectric constant, a capacitor can be formed by the capacitor electrode CAE, the gate electrode G1, and the first interlayer dielectric layer 141 disposed between them. The capacitor electrode CAE may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second interlayer dielectric layer 142 may be disposed over the capacitor electrode CAE. The second interlayer dielectric layer 142 may include an inorganic layer, for example, a silicon nitride layer, a silicon oxynitride layer, a silicon oxide layer, a titanium oxide layer, or an aluminum oxide layer. The second interlayer dielectric layer 142 may include a plurality of inorganic layers.

A first anode connection electrode ANDE1 may be disposed on the second interlayer dielectric layer 142. The first anode connection electrode ANDE1 may be connected to the drain electrode D1 of the thin-film transistor ST1 through a first connection contact hole ANCT1 that penetrates the gate insulator 130, the first interlayer dielectric layer 141 and the second interlayer dielectric layer 142. The first anode connection electrode ANDE1 may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

A first planarization layer 160 may be disposed over the first anode connection electrode ANDE1. The first planarization layer 160 may planarize an uneven surface formed by the thin-film transistor ST1. The first planarization layer 160 may include an organic layer such as an acryl resin, an epoxy resin, a phenolic resin, a polyamide resin and a polyimide resin.

A second anode connection electrode ANDE2 may be disposed on the first planarization layer 160. The second anode connection electrode ANDE2 may be connected to the first anode connection electrode ANDE1 through a second connection contact hole ANCT2 penetrating the first planarization layer 160. The second anode connection electrode ANDE2 may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

A second planarization layer 180 may be disposed on the second anode connection electrode ANDE2. The second planarization layer 180 may be formed as an organic layer such as an acryl resin, an epoxy resin, a phenolic resin, a polyamide resin or a polyimide resin.

Light-emitting elements LEL and a bank 190 may be disposed on the second planarization layer 180. Each of the light-emitting elements LEL includes a pixel electrode 171, an emissive layer 172, and a common electrode 173.

The pixel electrode 171 may be disposed on the second planarization layer 180. The pixel electrode 171 may be connected to the second anode connection electrode ANDE2 through a third connection contact hole ANCT3 penetrating the second planarization layer 180.

In the top-emission structure in which light exits from the emissive layer 172 toward the common electrode 173, the pixel electrode 171 may include a metal material having a high reflectivity such as a stack structure of aluminum and titanium (Ti/Al/Ti), a stack structure of aluminum and indium tin oxide (ITO) (ITO/Al/ITO), an APC alloy and a stack structure of APC alloy and ITO (ITO/APC/ITO). The APC alloy is an alloy of silver (Ag), palladium (Pd) and copper (Cu).

In order to define the first emission area EA1, the second emission area EA2, the third emission area EA3 and the fourth emission area EA4 in FIG. 5, the bank 190 may be formed to partition the pixel electrode 171 on the second planarization layer 180. The bank 190 may be disposed to cover edges of the pixel electrode 171. The bank 190 may include an organic layer such as an acryl resin, an epoxy resin, a phenolic resin, a polyamide resin or a polyimide resin.

In each of the first emission area EA1, the second emission area EA2, the third emission area EA3 and the fourth emission area EA4, the pixel electrode 171, the emissive layer 172 and the common electrode 173 are sequentially stacked on one another, so that holes from the pixel electrode 171 and electrons from the common electrode 173 are combined with each other in the emissive layer 172 to emit light.

The emissive layer 172 may be disposed on the pixel electrode 171 and the bank 190. The emissive layer 172 may include an organic material to emit light of a certain color. For example, the emissive layer 172 may include a hole transporting layer, an organic material layer, and an electron transporting layer.

The common electrode 173 may be disposed on the emissive layer 172. The common electrode 173 may be disposed to cover the emissive layer 172. The common electrode 173 may be a common layer formed commonly in the first emission area EA1, the second emission area EA2, the third emission area EA3 and the fourth emission area EA4. A capping layer may be formed on the common electrode 173.

In the top-emission organic light-emitting diode, the common electrode 173 may include a transparent conductive material (TCP) such as ITO and IZO that can transmit light, or a semi-transmissive conductive material such as magnesium (Mg), silver (Ag) and an alloy of magnesium (Mg) and silver (Ag). When the common electrode 173 is formed of a semi-transmissive metal material, the light extraction efficiency can be increased by using microcavities.

An encapsulation layer TFEL may be disposed on the common electrode 173. The encapsulation layer TFEL includes at least one inorganic layer to prevent permeation of oxygen or moisture into the emission material layer EML. In addition, the encapsulation layer TFEL includes at least one organic layer to protect the emission material layer EML from foreign substances such as dust. For example, the encapsulation layer TFEL includes a first inorganic encapsulation layer TFE1, an organic encapsulation layer TFE2 and a second inorganic encapsulation layer TFE3.

The first inorganic encapsulation layer TFE1 may be disposed on the common electrode 173, the organic encapsulation layer TFE2 may be disposed on the first inorganic encapsulation layer TFE1, and the second inorganic encapsulation layer TFE3 may be disposed on the organic encapsulation layer TFE2. The first inorganic encapsulation layer TFE1 and the second inorganic encapsulation layer TFE3 may include multiple layers in which one or more inorganic layers of a silicon nitride layer, a silicon oxynitride layer, a silicon oxide layer, a titanium oxide layer and an aluminum oxide layer are alternately stacked on one another. The organic encapsulation layer TFE2 may be an organic layer such as an acryl resin, an epoxy resin, a phenolic resin, a polyamide resin, a polyimide resin, etc.

The touch detector TDU may be disposed on the encapsulation layer TFEL. The touch detector TDU includes a first touch insulating layer TINS1, connection electrodes BE1, a second touch insulating layer TINS2, the driving electrodes TE, the sensing electrodes RE, and a third touch insulating layer TINS3.

The first touch insulating layer TINS1 may include an inorganic layer, for example, a silicon nitride layer, a silicon oxynitride layer, a silicon oxide layer, a titanium oxide layer, or an aluminum oxide layer.

The connection electrodes BE1 may be disposed on the first touch insulating layer TINS1. The connection electrode BE1 may include a single layer or multiple layers of one of molybdenum (Mo), aluminum (Al), chromium (Cr), gold (Au), titanium (Ti), nickel (Ni), neodymium (Nd) and copper (Cu) or an alloy thereof.

The second touch insulating layer TINS2 is disposed over the connection electrodes BEE The second touch insulating layer TINS2 may include an inorganic layer, for example, a silicon nitride layer, a silicon oxynitride layer, a silicon oxide layer, a titanium oxide layer, or an aluminum oxide layer. Alternatively, the second touch insulating layer TINS2 may include an organic layer such as an acryl resin, an epoxy resin, a phenolic resin, a polyamide resin or a polyimide resin.

The driving electrodes TE and the sensing electrodes RE may be disposed on the second touch insulating layer TINS2. In addition to the driving electrodes TE and the sensing electrodes RE, the dummy patterns DE, the first touch driving lines TL1, the second touch driving lines TL2 and the touch sensing lines RL shown in FIG. 4 may be disposed on the second touch insulating layer TINS1.

The driving electrodes TE and the sensing electrodes RE may be implemented as multiple layers in which a conductive metal electrode M1 and a metal oxide electrode B1 are stacked on one another. The conductive metal electrode M1 may include one of molybdenum (Mo), aluminum (Al), chromium (Cr), gold (Au), titanium (Ti), nickel (Ni), neodymium (Nd) and copper (Cu) or an alloy thereof. In addition, the metal oxide electrode B1 may include one of copper oxide (CuO) and chromium oxide (CrO) or an alloy thereof, or may further include a metal material that is blackened via oxidation process. The metal oxide electrode B1 made of copper oxide (CuO) and having a black color is formed by an oxidation process of the copper (Cu) electrode. The metal oxide electrode B1 made of chromium oxide (CrO) and having a black color is formed by an oxidation process of the chromium (Cr) electrode.

As the driving electrodes TE and the sensing electrodes RE are implemented as multiple layers in which the blackened metal oxide electrode B1 is stacked on the conductive metal electrode M1, the driving electrodes TE and the sensing electrodes RE not only can form the capacitance but also can work as a black matrix. In other words, since the blackened driving electrodes TE and sensing electrodes RE are formed in a mesh pattern or a net pattern so that they do not overlap the emission areas EA1, EA2, EA3 and EA4, they can function as a black matrix that prevents lights from the emission areas EA1, EA2, EA3 and EA4 from being mixed.

Although FIG. 6 shows an example in which each of the conductive metal electrode M1 and the metal oxide electrode B1 is implemented as a single layer, each of the conductive metal electrode M1 and the metal oxide electrode B1 may be implemented as multiple layers.

The driving electrodes TE and the sensing electrodes RE may overlap with the connection electrodes BE1 in the third direction (z-axis direction). The driving electrodes TE may be connected to the connection electrodes BE1 through touch contact holes TCNT1 penetrating through the second touch insulating layer TINS2.

The third touch insulating layer TINS3 is formed over the driving electrodes TE and the sensing electrodes RE. The third touch insulating layer TINS3 may provide a flat surface. The third touch insulating layer TINS3 may planarize an uneven surface formed by the driving electrodes TE, the sensing electrodes RE and the connection electrodes BE1. To this end, the third touch insulating layer TINS3 may include an inorganic layer, i.e., a silicon nitride layer, a silicon oxynitride layer, a silicon oxide layer, a titanium oxide layer, or an aluminum oxide layer. Alternatively, the third touch insulating layer TINS3 may include an organic layer such as an acryl resin, an epoxy resin, a phenolic resin, a polyamide resin or a polyimide resin.

The color filter layer CFL may be disposed on the touch detector TDU. The color filter layer CFL may be formed by disposing a plurality of first to third color filters CFL1, CFL2 and CFL3 in a planar shape on the third touch insulating layer TINS3.

The color filter layer CFL may be formed on the third touch insulating layer TINS3 so that it overlaps the first to fourth emission areas EA1 to EA4, or may be formed on the second touch insulating layer TINS2 including the driving electrodes TE and the sensing electrodes RE so that it overlaps the first to fourth emission areas EA1 to EA4.

The first color filter CFL1 may be disposed on the first emission area EA1 emitting light of the first color, the second color filter CFL2 may be disposed on the second emission area EA2 emitting light of the second color, and the third color filter CFL3 may be disposed on the third emission area EA3 emitting light of the third color. In addition, the second color filter CFL2 may be disposed on the fourth emission area EA4 that emits light of the second color.

For example, the first color may be red, the second color may be green, and the third color may be blue. Accordingly, the first color filter CFL1 may be a red color filter, the second color filter CFL2 may be a green color filter, and the third color filter CFL3 may be a blue color filter. Alternatively, the first and third emission areas EA1 and EA3 may emit green light which is light of the second color, the second emission area EA2 may emit red light which is light of the first color, and the fourth emission area EA4 may emit blue light which is light of the third color. Accordingly, the first color filter CFL1 may be a green color filter, the second color filter CFL2 may be a red color filter, and the third color filter CFL3 may be a blue color filter. As another example, at least one of the first to fourth emission areas EA1 to EA4 may emit white light. Accordingly, a transparent or white color filter may be formed on at least one emission area that emits white light.

The red color filter may selectively transmit red light of approximately 620 nm to 750 nm. The green color filter may selectively transmit green light of approximately 495 nm to 570 nm, and the blue color filter may selectively transmit blue light of approximately 450 nm to 495 nm.

The first to third color filters CFL1, CFL2 and CFL3 of the same color and a white color filter are disposed on the first to fourth emission areas EA1 to EA4 that emit light of the first to fourth colors, respectively. Accordingly, it is possible to prevent color mixing between the first to fourth emission areas EA1 to EA4 and to increase the color gamut. In addition, since the first to third color filters CFL1, CFL2 and CFL3 absorb a substantial amount of external light, it is possible to reduce the reflection of the external light without additional a polarizing plate.

The first to third color filters CFL1, CFL2 and CFL3 transmit light from the first to fourth emission areas EA1 to EA4 and reduce the reflectance of light incident from the outside. The amount of external light may be reduced to approximately ⅓ after it passes through the first to third color filters CFL1, CFL2 and CFL3. Accordingly, the light may be partially extinguished through the first to third color filters CFL1, CFL2 and CFL3, and may be partially reflected on the first to fourth emission areas EA1 to EA4 and the encapsulation layer TFEL disposed under the first to third color filters CFL1, CFL2 and CFL3. The reflected light may be incident back on the first to third color filters CFL1, CFL2 and CFL3, and the luminance of the reflected light is decreased while passing through the first to third color filters CFL1, CFL2, and CFL3. As a result, only a part of the external light is reflected back to the outside, so that the reflection of the external light can be reduced.

Each of the first to third color filters CFL1, CFL2 and CFL3 may include an organic material. According to an embodiment of the present disclosure, each of the first to third color filters CFL1, CFL2 and CFL3 may have a refractive index higher than that of the first to third touch insulating layers TINS1 to TINS3. For example, when the first to third touch insulating layers TINS1 to TINS3 each have a refractive index of approximately 1.53, the first to third color filters CFL1, CFL2 and CFL3 may have a refractive index of approximately 1.65. By forming the first to third color filters CFL1, CFL2 and CFL3 to have a higher refractive index than that of the first to third touch insulating layers TINS1 to TINS3, the lights traveling toward the sides can be condensed more effectively, and the light trapped at the interface of the encapsulation layer TFEL can be extracted, so that the total amount of lights can be increased.

FIGS. 7 to 10 are cross-sectional views showing processing steps of a method of fabricating the touch detector and the color filters according to an embodiment of the present disclosure.

Referring to FIGS. 7 to 10, the method for fabricating the touch detector and the color filter layer comprises: forming a first touch insulating layer TINS1 on an encapsulation layer TFEL; forming connection electrodes BE1 on the first touch insulating layer TINS1; forming a second touch insulating layer TINS2 on the first touch insulating layer TINS1 and the connection electrodes BE1; forming a plurality of touch contact holes TCNT1 in the second touch insulating layer TINS2; forming driving electrodes TE and sensing electrodes RE on the second touch insulating layer TINS2, and oxidizing and blackening them; forming a third touch insulating layer TINS3 on the second touch insulating layer TINS2, the driving electrodes TE, and the sensing electrodes RE; and forming a color filter layer CFL on the third touch insulating layer TINS3.

Figure 7:
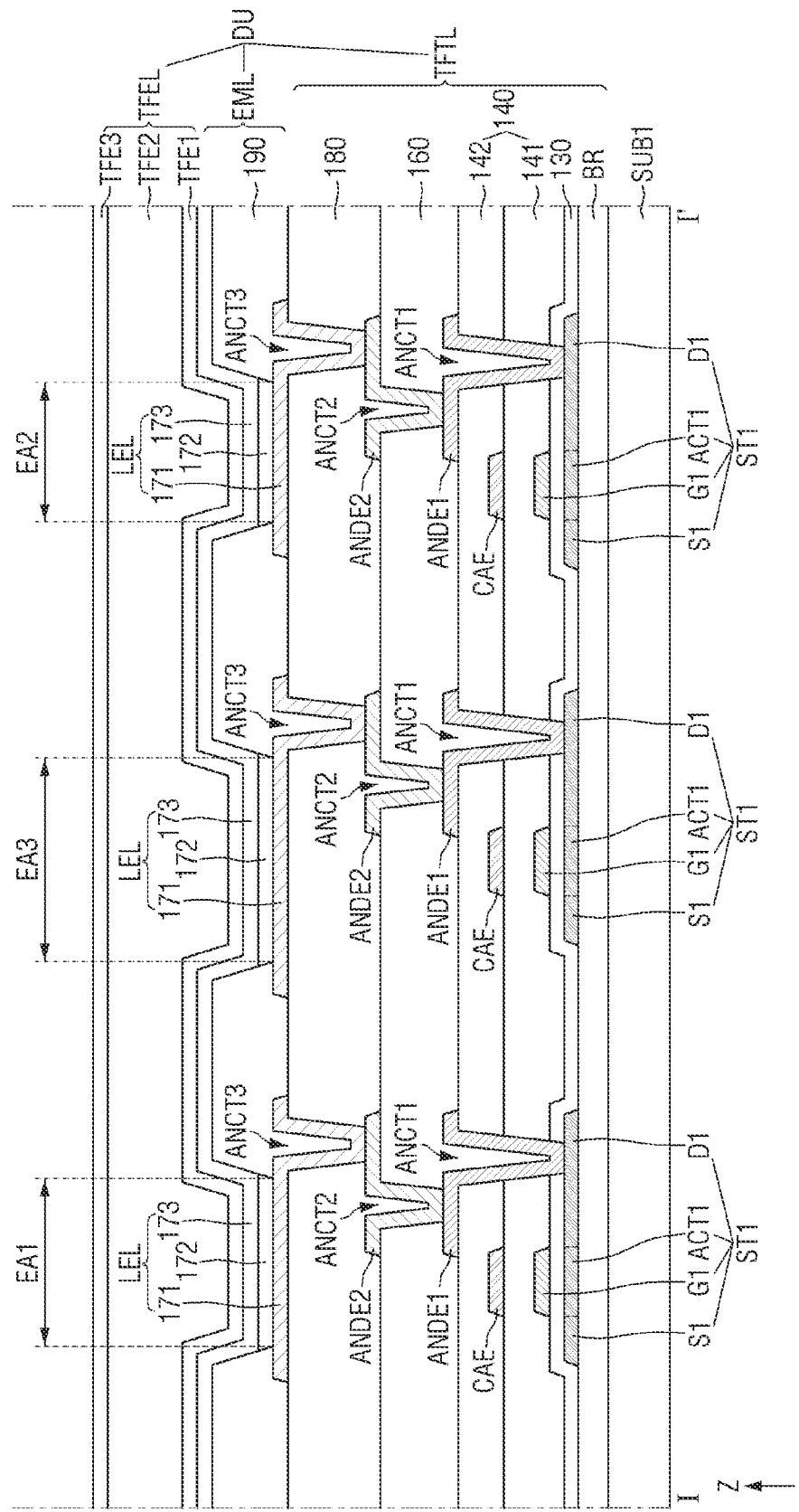
FIGS. 7, 8, 9 and 10 are cross-sectional views showing processing steps of a method of fabricating the touch detector and the color filters according to an embodiment of the present disclosure.
Figure 8:
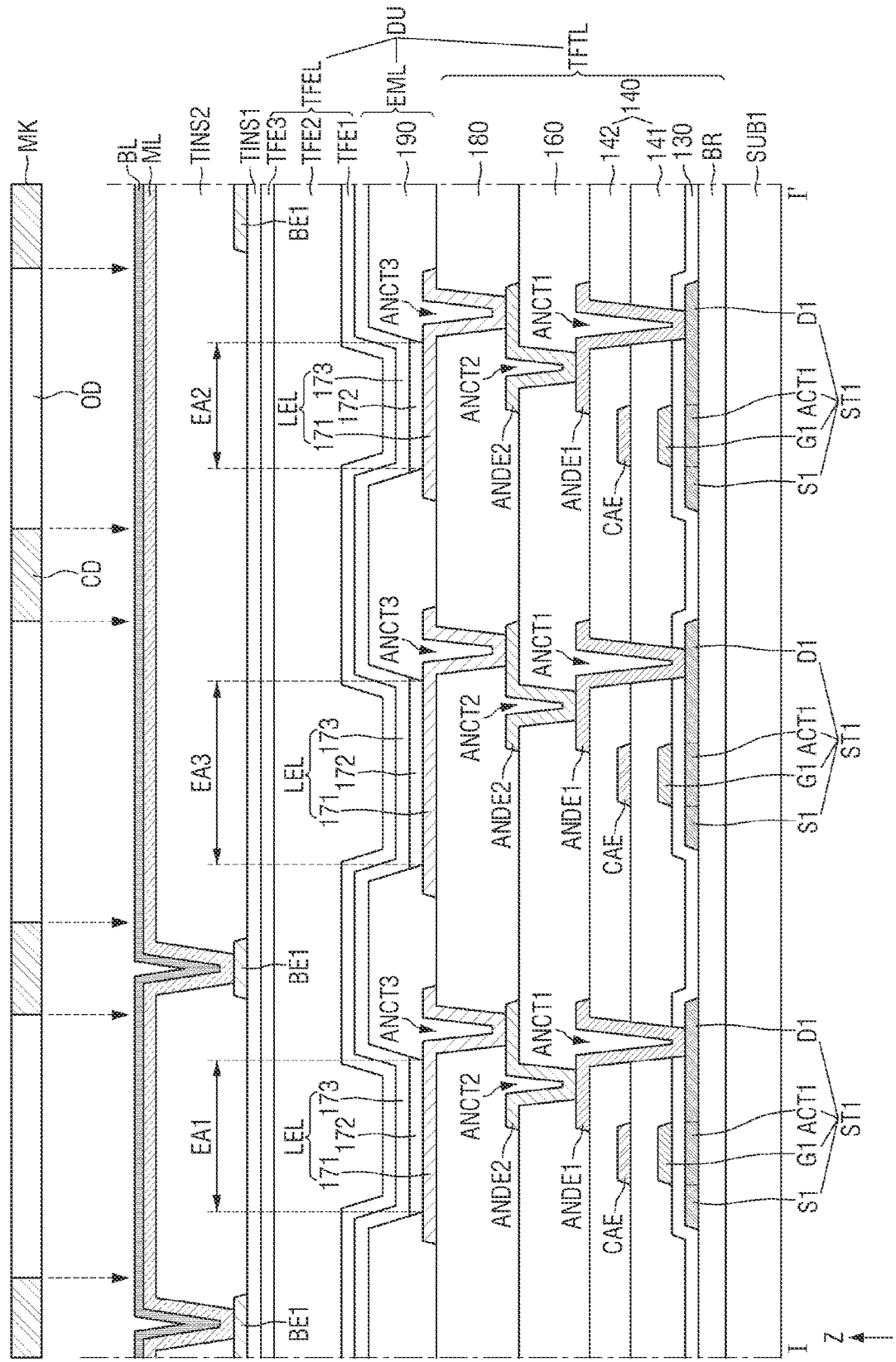

Referring to FIGS. 7 and 8, the first touch insulating layer TINS1 is formed by applying a first insulating material layer for forming the first touch insulating layer TINS1 on the encapsulation layer TFEL. The first insulating material layer may include any of the above-listed materials for the first touch insulating layer TINS1. The first insulating material layer may be applied by slit coating, spin coating, gravure printing, etc. For example, according to an embodiment of the present disclosure, the first insulating material layer may be deposited using chemical vapor deposition (CVD) utilizing chemical reaction. In addition, the first insulating material layer may include a photosensitive material.

The connection electrodes BE1 may be formed by forming a first conductive metal layer for forming the connection electrodes BE1 on the first touch insulating layer TINS1, applying a photoresist layer on the first conductive metal layer, and then performing a patterning process. Specifically, to form the connection electrodes BE1, the first conductive metal layer is formed by deposition such as physical vapor deposition (PVD) or chemical vapor deposition (CVD), and applying the photoresist layer on the first conductive metal layer. Subsequently, by performing exposure and development using a first mask, a first photoresist pattern is first formed. Then, by etching the first conductive metal layer using the first photoresist pattern as a mask, the connection electrodes BE1 are formed. The first conductive metal layer may include any of the above-listed metal materials for the connection electrodes BE1.

The second touch insulating layer TINS2 is formed by applying a second insulating material layer for forming the second touch insulating layer TINS2 on the entire surface of the first touch insulating layer TINS1 including the connection electrodes BE1. The second insulating material layer may include any of the above-listed materials for the second touch insulating layer TINS2. The second insulating material layer may be applied by slit coating, spin coating, gravure printing, etc. For example, the second insulating material may be stacked using a chemical vapor deposition method utilizing chemical reaction. In addition, the second insulating material layer may further include a photosensitive material.

To form the plurality of touch contact holes TCNT1 in the second touch insulating layer TINS2, a photoresist layer is applied on the second touch insulating layer TINS2 and exposure and development are performed using a contact mask for forming the contact hole, so that a plurality of contact hole formation patterns is formed. Then, the second touch insulating layer TINS2 on the connection electrodes BE1 is selectively etched using the plurality of contact hole forming patterns as a mask, so that a plurality of touch contact holes TCNT1 is formed. In doing so, the plurality of touch contact holes TCNT1 is formed such that they overlap with the connection electrodes BE1, respectively, so that a part of the front surface of each of the connection electrodes BE1 is exposed.

Figure 9:
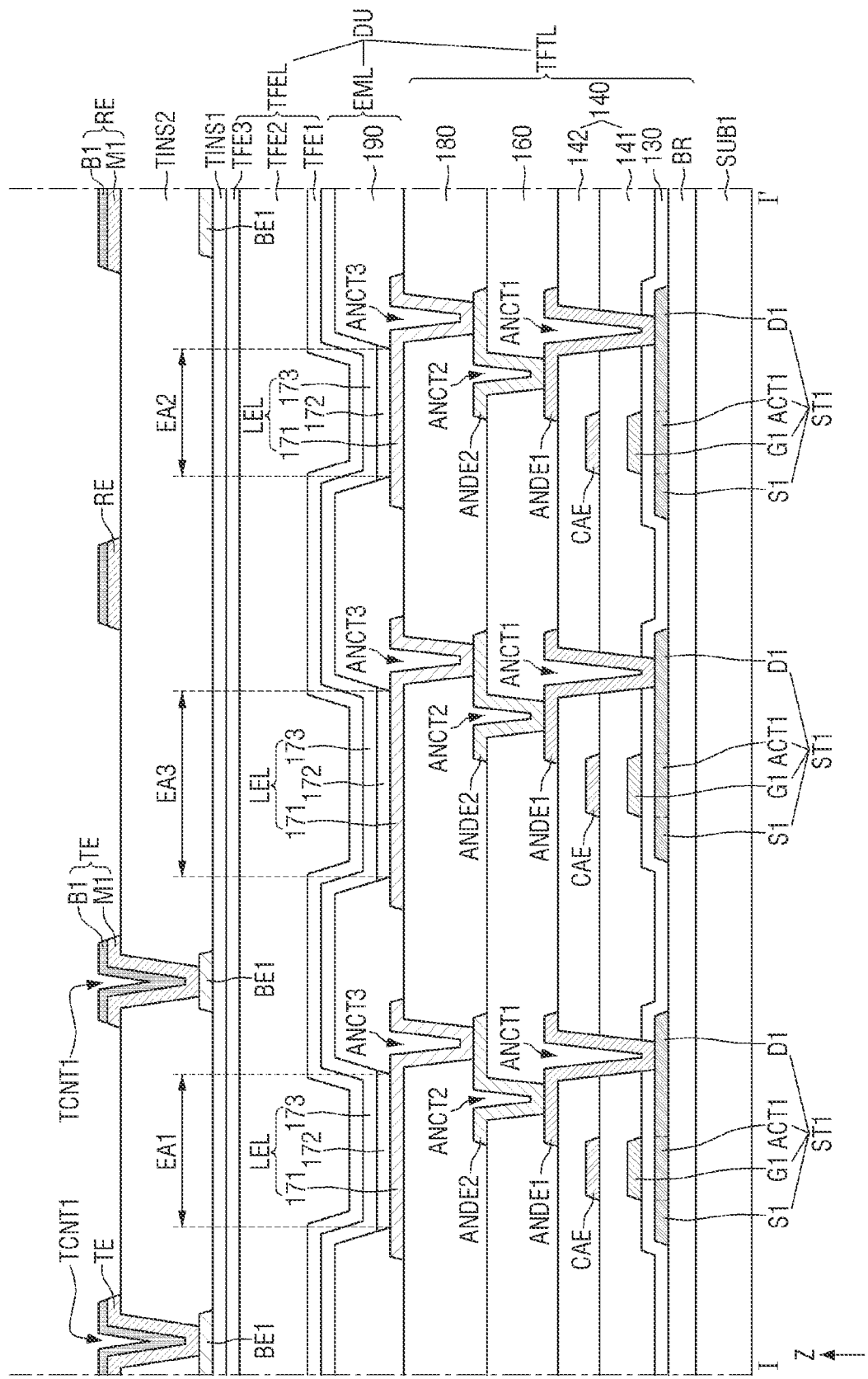

Referring to FIGS. 8 and 9, the driving electrodes TE and the sensing electrodes RE may be formed by forming the second conductive metal layer ML for forming the conductive metal electrodes M1 entirely on the second touch insulating layer TINS2 including the plurality of touch contact holes TCNT1, and further forming a third conductive metal layer BL for forming the metal oxide electrode B1 on the second conductive metal layer. Subsequently, a photoresist layer is applied on the third conductive metal layer BL and then is subjected to a patterning process. Specifically, to form the driving electrodes TE and the sensing electrodes RE, the second conductive metal layer ML and the third conductive metal layer BL are sequentially stacked. Subsequently, a photoresist layer is applied on the third conductive metal layer and exposure and development are conducted using a second mask MK having a light-blocking pattern CD and an open pattern OD formed therein, so that a second photoresist pattern is formed first. Then, the second conductive metal layer ML and the third conductive metal layer BL are etched using the second photoresist pattern as a mask, to form the driving electrodes TE and the sensing electrodes RE.

After the driving electrodes TE and the sensing electrodes RE are formed on the second touch insulating layer TINS2 including the plurality of touch contact holes TCNT1, an oxidation process is performed for a predetermined period of time, and the upper surfaces of the driving electrode TE and the sensing electrodes RE are blackened. The second conductive metal layer ML and the third conductive metal layer BL may include any of the above-listed metal materials for the driving electrodes TE and the sensing electrodes RE. When the driving electrodes TE and the sensing electrodes RE are formed, the dummy patterns DE, the first touch driving lines TL1, the second touch driving lines TL2 and the touch sensing lines RL shown in FIG. 4 may also be formed.

As another method of blackening the upper surfaces of the driving electrodes TE and the sensing electrodes RE, the third conductive metal layer BL for forming the metal oxide electrode B1 may be formed on the second conductive metal layer ML, and then an oxidation process of the third conductive metal layer BL may be performed for a predetermined period of time to blacken the third conductive metal layer BL. After the third conductive metal layer BL is blackened, a photoresist layer is applied on the third conductive metal layer BL and a patterning process is performed to form the driving electrodes TE and the sensing electrodes RE.

In addition, the driving electrodes TE and the sensing electrodes RE may be formed by forming the second conductive metal layer ML, and then additionally forming a third conductive metal layer BL on the second conductive metal layer ML and oxidizing it. Specifically, the second conductive metal layer ML for forming the conductive metal electrodes M1 may be formed entirely on the second touch insulating layer TINS2 including the plurality of touch contact holes TCNT1, the photoresist layer may be applied on the second conductive metal layer ML, and then a patterning process may be performed to form the conductive metal electrodes M1 first. Then, the third conductive metal layer BL for forming the metal oxide electrodes B1 may be formed on the entire surface of the second touch insulating layer TINS2 including the conductive metal electrodes M1, a photoresist layer is applied on the third conductive metal layer BL, and a patterning process may be performed to form metal oxide electrodes B1 on the conductive metal electrodes M1. After the driving electrodes TE and the sensing electrodes RE are formed such that the conductive metal electrodes M1 overlap the metal oxide electrodes B1, an oxidation process is performed for a predetermined period of time, and the upper surfaces of the driving electrode TE and the sensing electrodes RE are blackened. Likewise, when the driving electrodes TE and the sensing electrodes RE are formed, the dummy patterns DE, the first touch driving lines TL1, the second touch driving lines TL2 and the touch sensing lines RL shown in FIG. 4 may also be formed.

As another method of blackening the upper surfaces of the driving electrodes TE and the sensing electrodes RE, the third conductive metal layer BL for forming the metal oxide electrode B1 may be formed entirely on the second touch insulating layer TINS2 including the conductive metal electrodes M1, and then an oxidation process of the third conductive metal layer BL may be performed for a predetermined period of time to blacken the third conductive metal layer BL. After the third conductive metal layer BL is blackened, a photoresist layer may be applied on it, and a patterning process may be performed to form the driving electrodes TE and the sensing electrodes RE.

Figure 10:
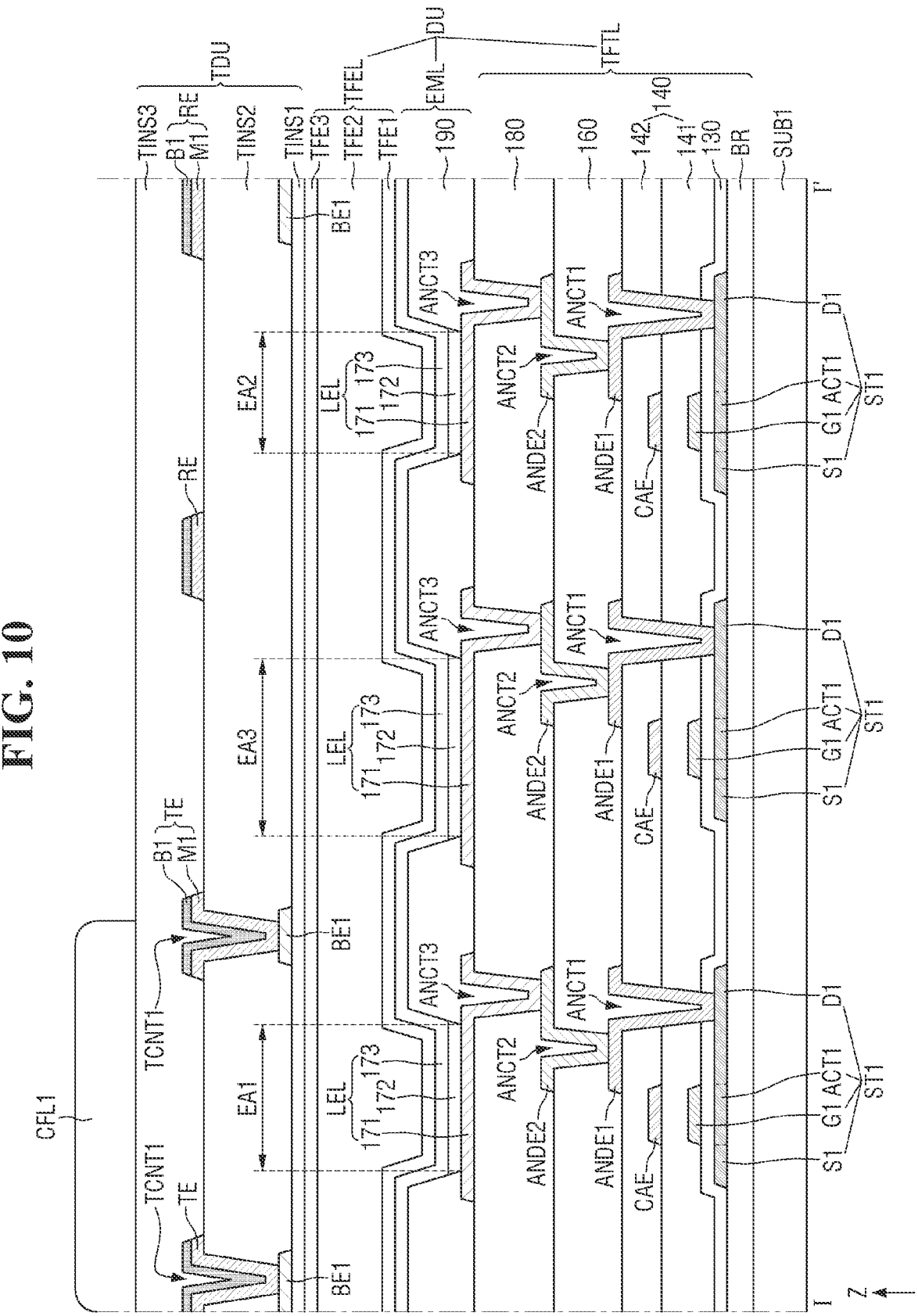

Referring to FIG. 10, the third touch insulating layer TINS3 is formed by applying a third insulating material layer for forming the third touch insulating layer TINS3 on the entire surface of the second touch insulating layer TINS2 including the driving electrodes TE and the sensing electrodes RE. The third insulating material layer may include any of the above-listed materials for the third touch insulating layer TINS3.

The color filter layer CFL may be formed by sequentially printing a liquid-repellent material layer containing red, green and blue alignment materials on the third touch insulating layer TINS3 using a printing method such as inkjet printing. To form the color filter layer CFL, a red liquid-repellent material layer may be disposed to overlap the first emission area EA1 to form a red first color filter CFL1, a green liquid-repellent material layer may be disposed to overlap the second emission area EA2 to form a green second color filter CFL2, and a blue liquid-repellent material layer may be disposed to overlap the third emission area EA3 to form a blue third color filter CFL3. The alignment materials may be an organic polymer material. The organic polymer material may include, for example, at least one of a hydrophobic fluorinated silane-based promoter, a fluorinated acryl-based monomer, and a fluorinated alkyl-based organic material. The order of forming the red first color filter CFL1, the green second color filter CFL2 and the blue third color filter CFL3 is not limited to that shown in FIG. 10.

Figure 11:
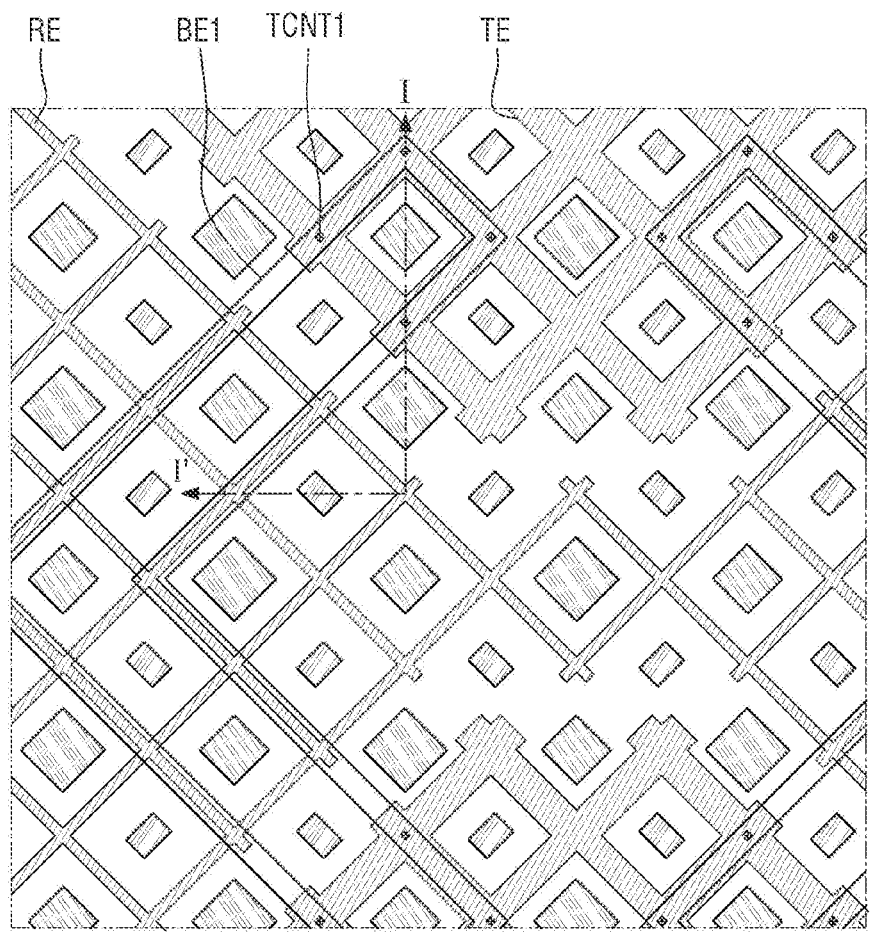
FIG. 11 is an enlarged plan view showing another example of the touch nodes of FIG. 4 in detail.

FIG. 11 is an enlarged plan view showing another example of the touch nodes of FIG. 4 in detail.

Referring to FIG. 11, driving electrodes TE and sensing electrodes RE are formed on the same layer and are spaced apart from each other with a predetermined distance. Each of the driving electrodes TE, the sensing electrodes RE and the connection electrodes BE1 may be formed in a mesh pattern or a net pattern in a plan view. Therefore, it is possible to prevent the luminance of the lights emitted from the emission areas EA1, EA2, EA3 and EA4 from being lowered, which may occur as the lights are blocked by the driving electrodes TE, the sensing electrodes RE and the connection electrodes BE1. Accordingly, as the line widths of the driving electrodes TE, the sensing electrodes RE and the connection electrodes BE1, i.e., the width in the first direction (x-axis direction) or the second direction (y-axis direction) increase, the luminance of lights emitted from the emission areas EA1, EA2, EA3 and EA4 may decrease. On the other hand, as the line widths of the driving electrodes TE, the sensing electrodes RE and the connection electrodes BE1 decrease, the resistance increases, and thus the detecting performance is deteriorated due to the RC delay. Accordingly, the emission efficiency or touch detecting performance may be affected by the size of the emission areas EA1, EA2, EA3 and EA4, the luminance of light emitted from the emission areas EA1, EA2, EA3 and EA4, the area of the touch sensing area TSA, and the degree of RC delay. In order to prevent deterioration of the emission efficiency or touch detecting performance, the line widths of at least one of the driving electrodes TE, the sensing electrodes RE and the connection electrodes BE1 are set to be equal to or different from each other.

For example, the line width of the driving electrodes TE may be larger than the line widths of the sensing electrodes RE and the connection electrodes BE1. In other words, the line width of the driving electrodes TE formed in the mesh pattern or the net pattern in the fourth direction DR4 and the fifth direction DR5 may be greater than the line widths of the sensing electrodes RE and the connection electrodes BE1. Accordingly, the touch detecting performance of the driving electrodes TE may become higher than the touch detecting performance of the sensing electrodes RE and the connection electrodes BE1, and the display luminance of light passing through the sensing electrodes RE and the connection electrode BE1 may become higher than the display luminance of the light passing through the driving electrodes TE.

Figure 12:
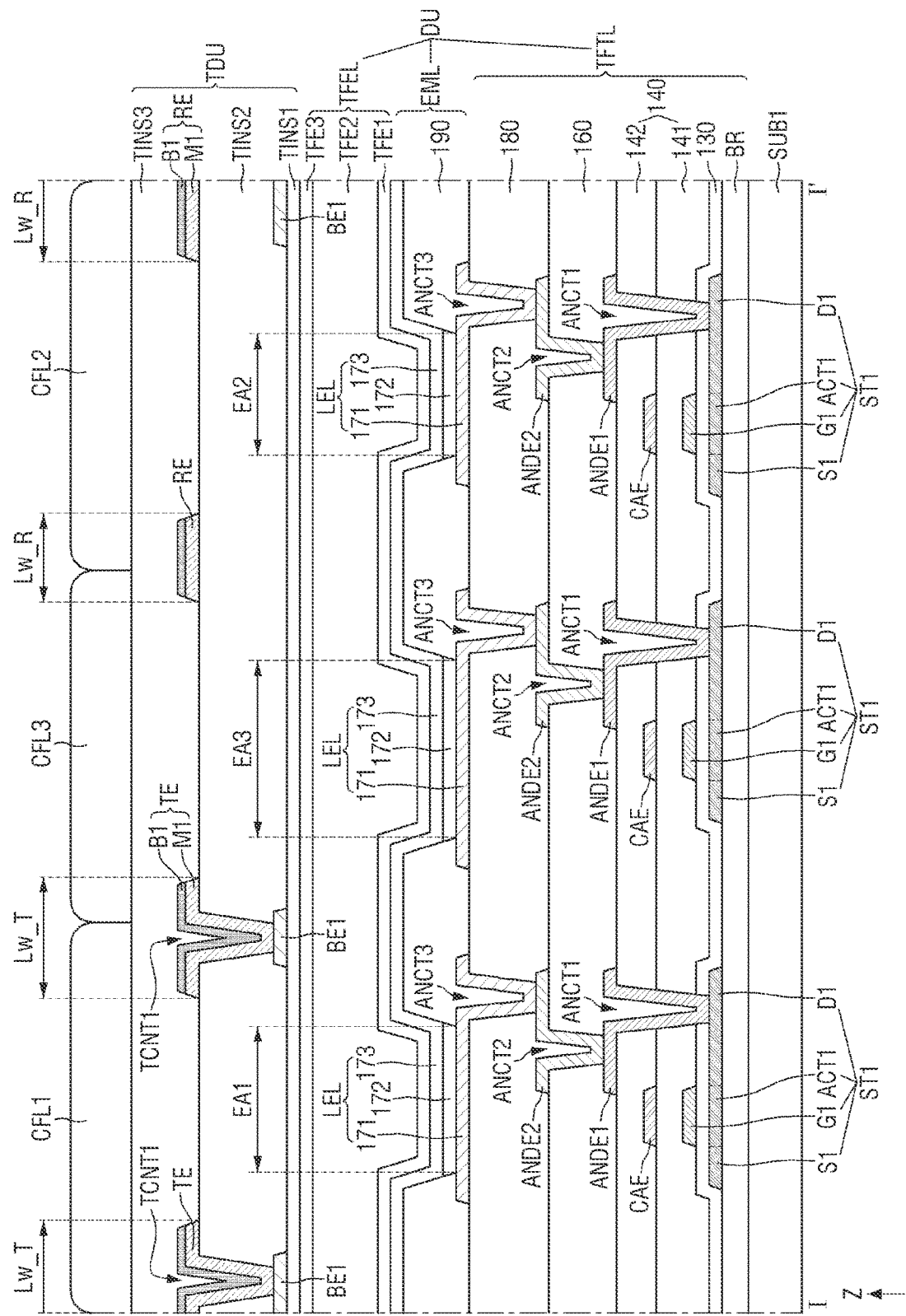
FIG. 12 is a cross-sectional view showing an example of a display panel, taken along line I-I' of FIG. 11.
Figure 13:
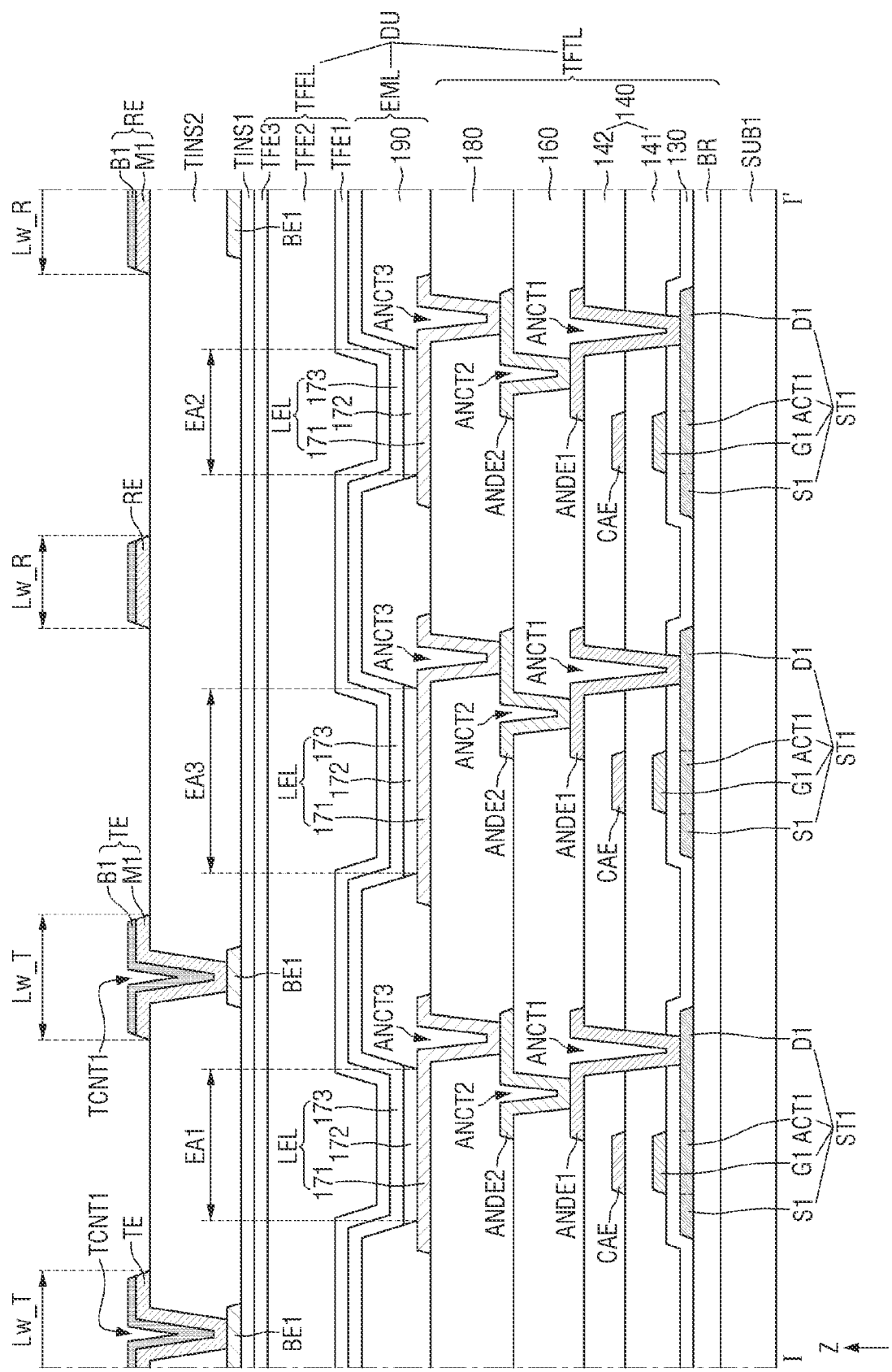
FIG. 13 is a cross-sectional view showing a processing step of fabricating a touch detector according to the embodiment of FIG. 11.

FIG. 12 is a cross-sectional view showing an example of a display panel taken along line I-I' of FIG. 11. FIG. 13 is a cross-sectional view showing a processing step of fabricating a touch detector according to the embodiment of FIG. 11.

Referring to FIGS. 12 and 13, the line width Lw_T of the driving electrodes TE may be greater than the line width Lw_R of the connection electrodes BE1 and the sensing electrodes RE.

In order to form the driving electrodes TE having a line width greater than that of the sensing electrodes RE, the driving electrodes TE and the sensing electrodes RE may be patterned by using a second mask in which the width of the light-blocking pattern of the second mask corresponding to the driving electrodes TE is greater than the width of the light-blocking pattern corresponding to the sensing electrodes RE.

Specifically, to form the driving electrodes TE and the sensing electrodes RE, the second conductive metal layer ML for forming the conductive metal electrodes M1 and the third conductive metal layer BL for forming the metal oxide electrode B1 are sequentially stacked. Subsequently, by performing exposure and development using the second mask, a second photoresist pattern may be first formed. Accordingly, by etching the second conductive metal layer ML and the third conductive metal layer BL using the second photoresist pattern as a mask, the sensing electrodes RE and the driving electrodes TE having a line width greater than that of the sensing electrodes RE can be formed. Subsequently, the upper surfaces of the driving electrodes TE and the sensing electrodes RE may be blackened by performing an oxidation process for a predetermined period of time.

As described above, in the process of blackening the upper surfaces of the sensing electrodes RE and the driving electrodes TE, the applied third conductive metal layer BL may be first patterned and then oxidized and blackened, or the third conductive metal layer BL may be oxidized and blackened and then patterned.

Figure 14:
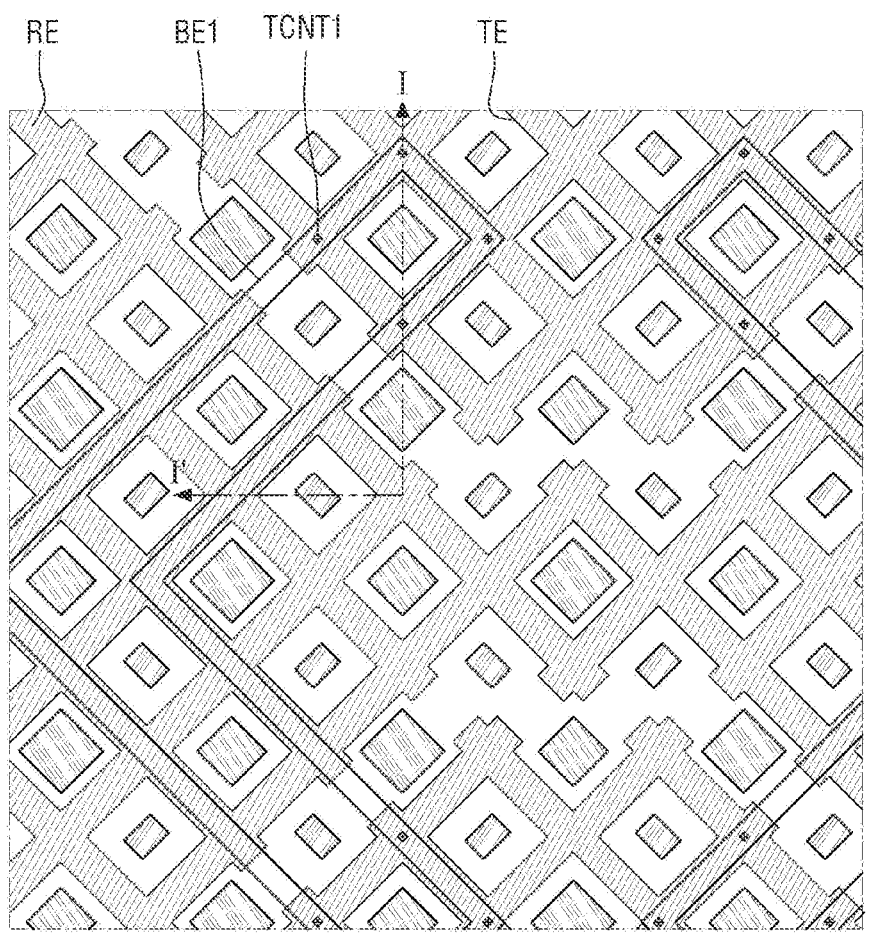
FIG. 14 is an enlarged plan view showing yet another example of the touch nodes of FIG. 4 in detail.

FIG. 14 is an enlarged plan view showing yet another example of the touch nodes of FIG. 4 in detail.

Referring to FIG. 14, each of driving electrodes TE, sensing electrodes RE and connection electrodes BE1 may be formed in a mesh pattern or a net pattern in a plan view. As the line widths of the driving electrodes TE, the sensing electrodes RE and the connection electrodes BE1 increase, the luminance of lights emitted from the emission areas EA1, EA2, EA3 and EA4 may decrease. On the other hand, as the line widths of the driving electrodes TE, the sensing electrodes RE and the connection electrodes BE1 decrease, the resistance increases, and thus the detecting performance is deteriorated due to the RC delay. Accordingly, in order to prevent deterioration of the emission efficiency or touch detecting performance, the line widths of at least one of the driving electrodes TE, the sensing electrodes RE and the connection electrodes BE1 are set to be equal to or different from each other.

For example, among the driving electrodes TE, the sensing electrodes RE and the connection electrodes BEL the line widths Lw_T of the driving electrodes TE and the line width Lw_R of the sensing electrodes RE may be greater than the line width Lw_B of the connection electrodes BE1, and the line widths Lw_T of the driving electrodes TE and the line width Lw_R of the sensing electrodes RE may be equal to or different from each other.

The line widths Lw_T of the driving electrodes TE and the line width Lw_R of the sensing electrodes RE formed in the mesh pattern or the net pattern in the fourth direction DR4 and the fifth direction DR5 may be greater than the line width Lw_B of the connection electrodes BE1. Accordingly, the touch detecting performance according to the driving electrodes TE and the sensing electrodes RE may be further increased depending on the increase of the line width. As such, the line widths Lw_T of the driving electrodes TE and the line width Lw_R of the sensing electrodes RE may vary depending on the size of the emission areas EA1, EA2, EA3 and EA4, the luminance of light emitted from the emission areas EA1, EA2, EA3 and EA4, the area of the touch sensing area TSA, and the degree of RC delay.

Figure 15:
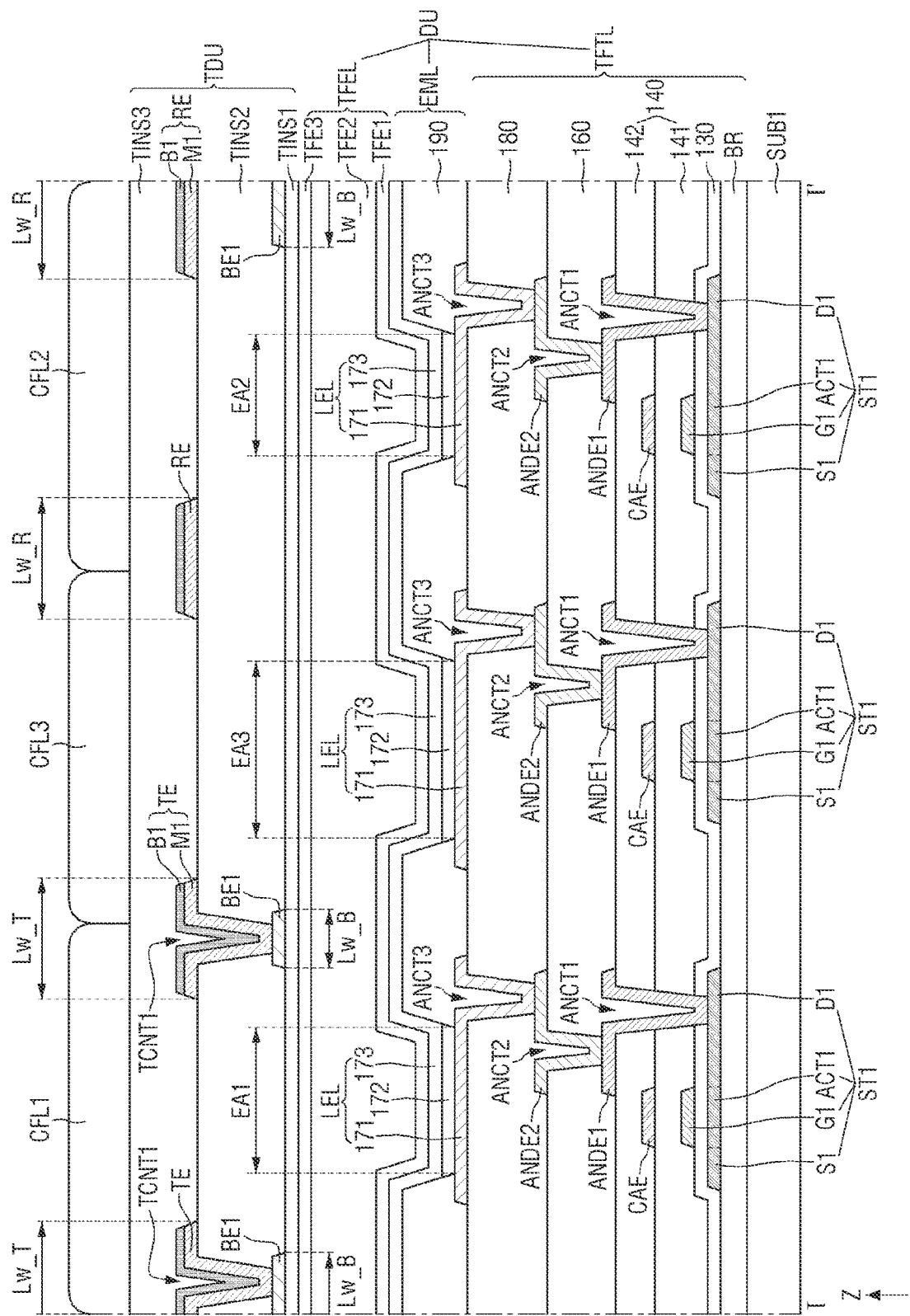
FIG. 15 is a cross-sectional view showing an example of a display panel, taken along line I-I' of FIG. 14.

FIG. 15 is a cross-sectional view showing an example of a display panel, taken along line I-I' of FIG. 14.

Referring to FIG. 15, the line width Lw_T of the driving electrodes TE and the line width Lw_R of the sensing electrodes RE may be greater than the line width Lw_B of the connection electrodes BE1.

In order to form the driving electrodes TE and the sensing electrodes RE having line widths greater than that of the connection electrodes BE, the driving electrodes TE and the sensing electrodes RE may be patterned by using the second mask in which the width of the light-blocking pattern of the second mask corresponding to the driving electrodes TE and the sensing electrodes RE is greater than the width of the light-blocking pattern corresponding to the connection electrodes BE1.

To form the driving electrodes TE and the sensing electrodes RE, the second conductive metal layer ML for forming the conductive metal electrodes M1 and the third conductive metal layer BL for forming the metal oxide electrode B1 are sequentially stacked. Subsequently, by performing exposure and development using the second mask, a second photoresist pattern may be first formed. By etching the second conductive metal layer ML and the third conductive metal layer BL using the second photoresist pattern as a mask, the driving electrodes RE and the sensing electrodes RE having line widths greater than the line width of the connecting electrodes BE1 can be formed. Subsequently, the upper surfaces of the driving electrodes TE and the sensing electrodes RE may be blackened by performing an oxidation process for a predetermined period of time. In the process of blackening the upper surfaces of the sensing electrodes RE and the driving electrodes TE, the applied third conductive metal layer BL may be first patterned and then oxidized and blackened, or the third conductive metal layer BL may be oxidized and blackened and then patterned.

Figure 16:
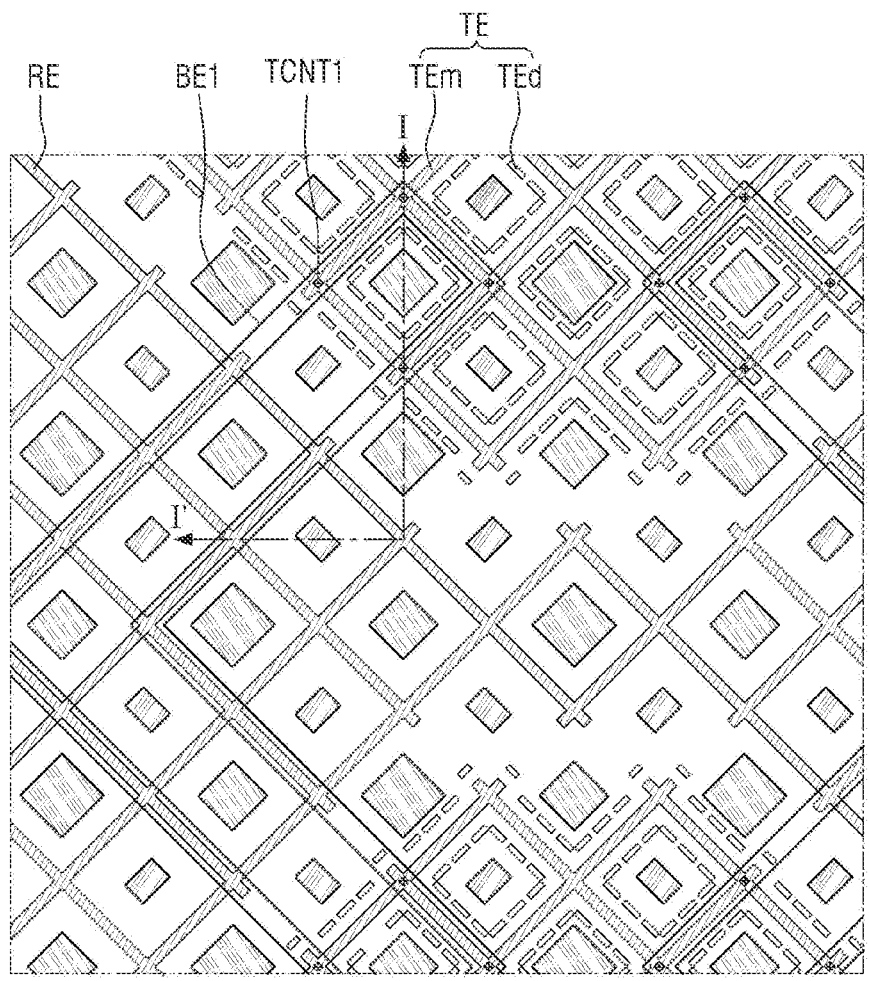
FIG. 16 is another enlarged plan view showing yet another example of the touch nodes of FIG. 4 in detail.
Figure 16:
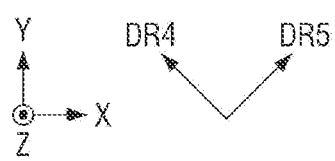

FIG. 16 is another enlarged plan view showing yet another example of the touch nodes of FIG. 4 in detail.

Referring to FIG. 16, as the line widths of the driving electrodes TE, the sensing electrodes RE and the connection electrodes BE1 increase, the luminance of lights emitted from the emission areas EA1, EA2, EA3 and EA4 may decrease. For this reason, it is necessary to adjust so that the luminance of the lights emitted from the emission areas EA1, EA2, EA3 and EA4 does not decrease without deteriorating the touch detecting performance. To this end, among the driving electrodes TE, the sensing electrodes RE and the connection electrodes BE1, the line width Lw_T of the driving electrodes TE may be greater than the line widths Lw_R of the sensing electrodes RE and the line width Lw_B of the connection electrodes BE1. The driving electrodes TE may include signal electrodes Tem electrically connected to the connection electrodes BE1 to receive touch driving signals and signal floating electrodes TEd separated from the signal electrodes TEm, disposed between emission areas EA1, EA2, EA3 and EA4 and the signal electrodes TEm to surround the emission areas, and remaining in a floating state.

Specifically, the signal electrodes TEm of the driving electrodes TE may be formed in a mesh pattern or a net pattern in the fourth direction DR4 and the fifth direction DR5. The line width of the signal electrode TEm may be equal to line widths Lw_R of the sensing electrodes RE. The line width Lw_B of the connection electrodes BE1 may be greater than the line width of the signal electrode TEm and the line width Lw_B of the connection electrodes BE1. In addition, distances between the signal floating electrodes TEd and the signal electrode TEm may be uniform. The distances between the signal floating electrodes TEd and the signal electrode TEm may be different. The signal floating electrodes TEd may be formed in a square, rectangular or polygonal shape. Here, the luminance of the lights emitted from the emission areas EA1, EA2, EA3 and EA4 may be adjusted according to the density, size, and arrangement shape of the signal floating electrodes TEd.

Figure 17:
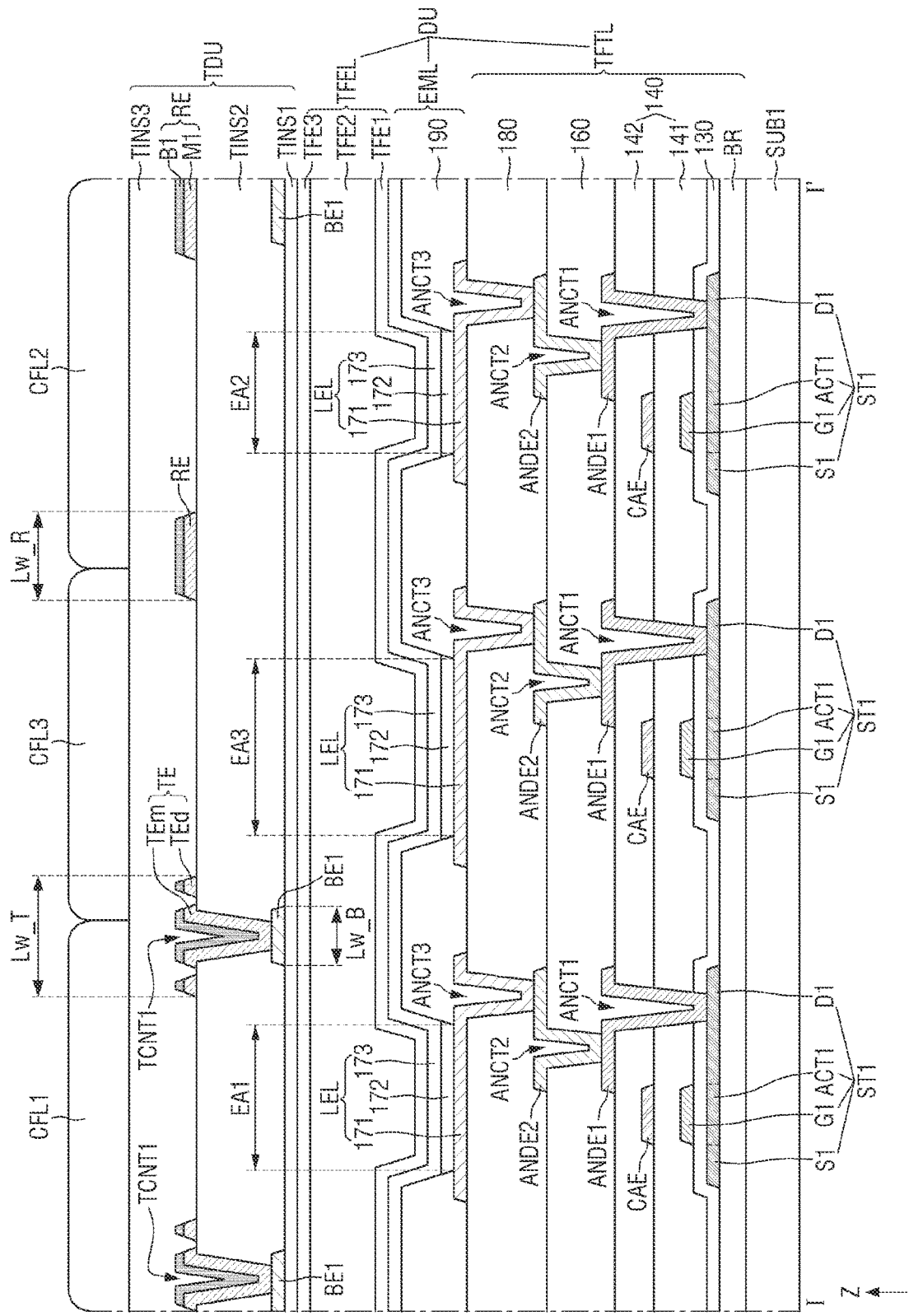
FIG. 17 is a cross-sectional view showing an example of the display panel taken along line I-I' of FIG. 16.
Figure 18:
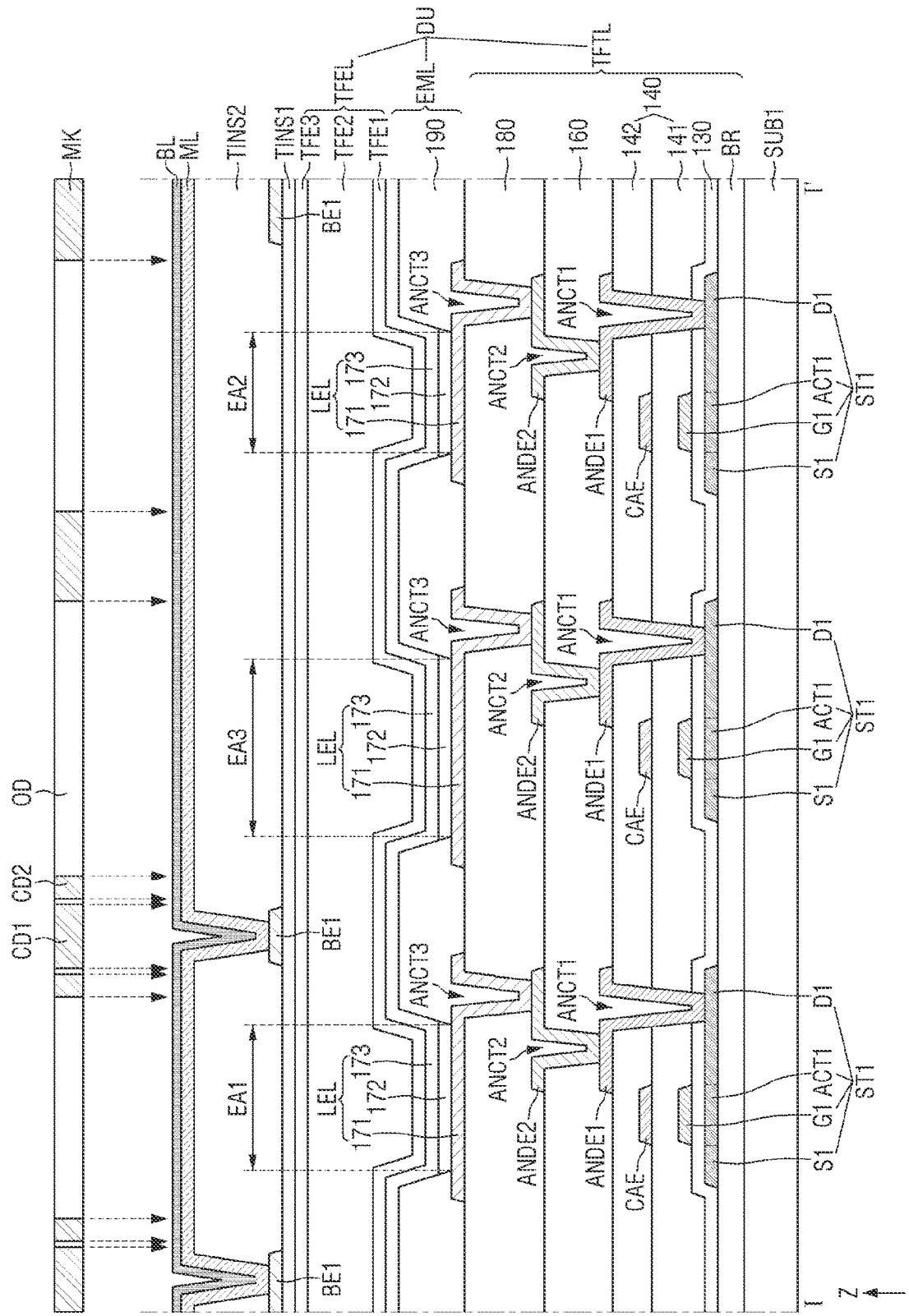
FIG. 18 is a cross-sectional view showing a processing step of fabricating a touch detector according to the embodiment of FIGS. 16 and 17.

FIG. 17 is a cross-sectional view showing an example of the display panel taken along line I-I' of FIG. 16. FIG. 18 is a cross-sectional view showing a processing step of fabricating a touch detector according to the embodiment of FIGS. 16 and 17.

Referring to FIGS. 17 and 18, in order to form the driving electrodes TE having a line width Lw_T greater than a line width Lw_R of the sensing electrodes RE, the driving electrodes TE and the sensing electrodes RE may be patterned by using a second mask MK in which the width of the light-blocking pattern CD of the second mask MK for forming the signal electrodes TEm is same to the width of the light-blocking pattern CD for forming the sensing electrodes RE and including a light-blocking pattern for forming the signal floating electrodes TEd which are disposed on both sides of the signal electrodes TEm.

In particular, in order to form the driving electrodes TE to include the signal electrode TEm and a plurality of signal floating electrodes TEd separated from the signal electrode TEm, the signal electrodes TEm and the signal floating electrodes TEd may be patterned by using a second mask MK in which a plurality of first light-blocking patterns CD1 corresponding to the signal electrodes TEm of the driving electrodes TE and second light-blocking patterns CD2 corresponding to the signal floating electrodes TEd of the driving electrodes TE are formed.

To form the driving electrodes TE and the sensing electrodes RE, the second conductive metal layer ML for forming the conductive metal electrodes M1 and the third conductive metal layer BL for forming the metal oxide electrode B1 are sequentially stacked. Then, exposure and development are performed using the second mask MK in which the first and second light-blocking patterns CD1 and CD2 are formed. A second photoresist pattern for forming the signal electrodes TEm and the signal floating electrodes TEd may be formed on the third conductive metal layer BL. Then, by etching the second conductive metal layer ML and the third conductive metal layer BL using the second photoresist pattern as a mask, the driving electrodes TE including the signal electrodes TEm and the signal floating electrodes TEd may be formed. Subsequently, the upper surfaces of the driving electrodes TE including the signal electrodes TEm and the signal floating electrodes Ted, and the sensing electrodes RE may be blackened by performing an oxidation process for a predetermined period of time. In the process of blackening the upper surfaces of the sensing electrodes RE and the driving electrodes TE, the applied third conductive metal layer BL may be first patterned and then oxidized and blackened, or the third conductive metal layer BL may be oxidized and blackened and then patterned.

Figure 19:
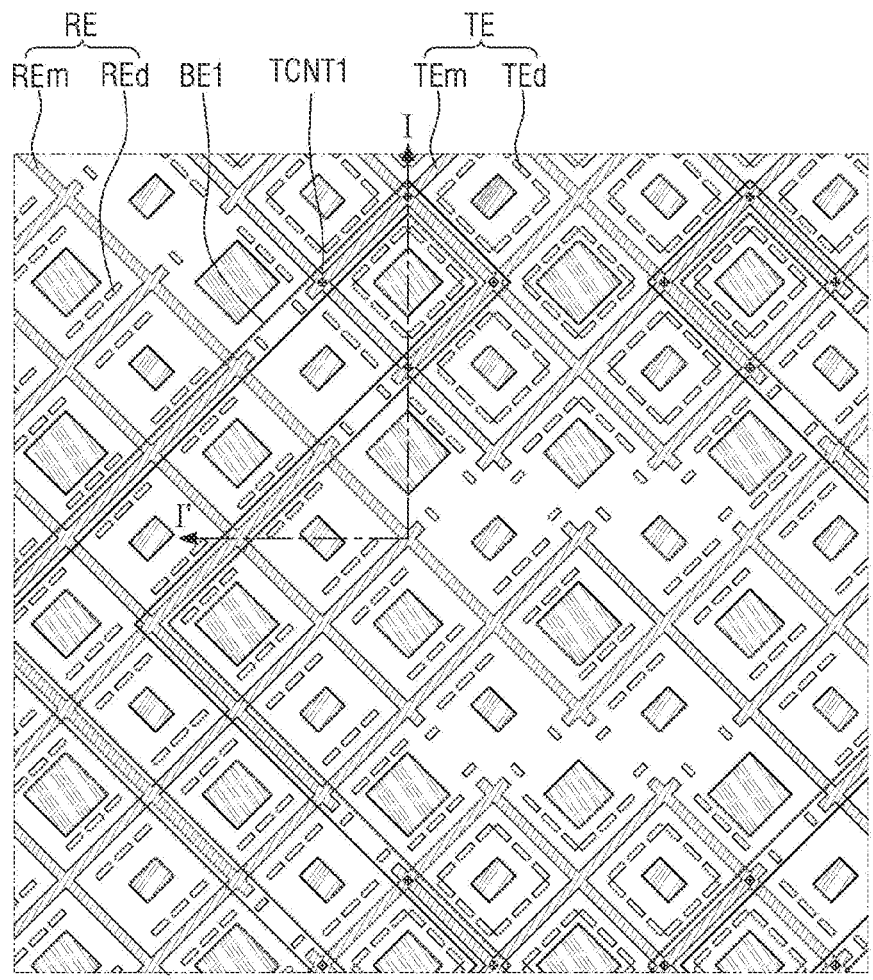
FIG. 19 is yet another enlarged plan view showing yet another example of the touch nodes of FIG. 4 in detail.

FIG. 19 is yet another enlarged plan view showing yet another example of the touch nodes of FIG. 4 in detail.

Referring to FIG. 19, it is necessary to adjust the line widths Lw_T of the driving electrodes TE and the line width Lw_R of the sensing electrodes RE so that the luminance of the lights emitted from the emission areas EA1, EA2, EA3 and EA4 does not decrease without deteriorating the touch detecting performance. To this end, the line widths Lw_T of the driving electrodes TE and the line width Lw_R of the sensing electrodes RE may be greater than the line width Lw_B of the connection electrodes BEE The driving electrodes TE may include signal electrodes Tem electrically connected to the connection electrodes BE1 to receive touch driving signals, and signal floating electrodes TEd separated from the signal electrodes TEm and remaining in a floating state.

In addition, the sensing electrodes RE may include a transfer electrode REm to which a voltage equal to the capacitance of the touch nodes TN is transmitted, and transfer floating electrodes REd separated from the transfer electrode REm and remaining in a floating state.

Specifically, the transfer electrodes REm of the sensing electrodes RE may be formed in a mesh pattern or a net pattern in the fourth direction DR4 and the fifth direction DR5. The transfer floating electrodes REd separated from the transfer electrodes REm may form the same gap or different gaps between the transfer electrodes REm and the transfer floating electrodes REd adjacent thereto, and may be formed in a square, rectangular or polygonal shape. The luminance of the lights emitted from the emission areas EA1, EA2, EA3 and EA4 may be adjusted according to the density, size and arrangement shape of the transfer floating electrodes REd.

Figure 20:
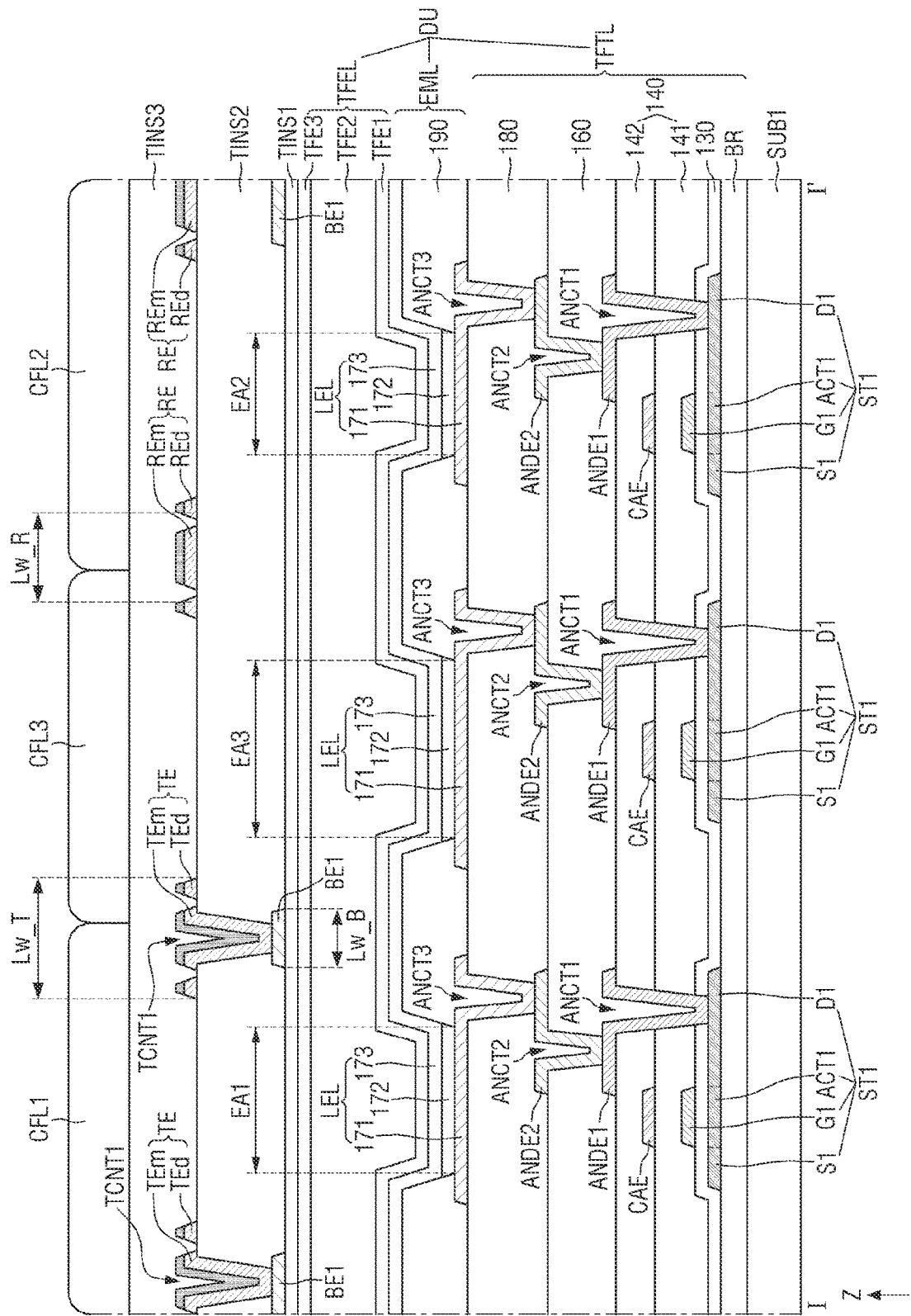
FIG. 20 is a cross-sectional view showing an example of the display panel taken along line I-I' of FIG. 19.

FIG. 20 is a cross-sectional view showing an example of the display panel taken along line I-I' of FIG. 19.

Referring to FIG. 20, in order to form the sensing electrodes RE having a line width Lw_R greater than a line width Lw_B of the connection electrodes BE1, the driving electrodes TE and the sensing electrodes RE may be patterned by using a second mask in which the width of the light-blocking pattern of the second mask for forming the sensing electrodes RE is greater than the width of the light-blocking pattern for forming the connection electrodes BE1.

In particular, in order to form the sensing electrodes RE to include the transfer electrode REm and a plurality of transfer floating electrodes REd separated from the transfer electrode REm, the transfer electrodes REm and the transfer floating electrodes REd may be patterned by using a second mask in which a plurality of third light-blocking patterns corresponding to the transfer electrodes REm of the sensing electrodes RE and fourth light-blocking patterns corresponding to the transfer floating electrodes REd are formed.

To form the driving electrodes TE and the sensing electrodes RE, the second conductive metal layer ML for forming the conductive metal electrodes M1 and the third conductive metal layer BL for forming the metal oxide electrode B1 are sequentially stacked. Then, exposure and development are performed using the second mask in which the first and second light-blocking patterns are formed. A second photoresist pattern for forming the transfer electrodes REm and the transfer floating electrodes REd may be formed on the third conductive metal layer BL. By etching the second conductive metal layer ML and the third conductive metal layer BL using the second photoresist pattern as a mask, the driving electrodes RE including the signal electrodes TEm and the signal floating electrodes Ted, and the sensing electrodes RE including the transfer electrodes REm and the transfer floating electrodes Red may be formed. Subsequently, the upper surfaces of the sensing electrodes RE including the transfer electrodes REm and the transfer floating electrodes Red, and the driving electrodes TE including the signal electrodes TEm and the signal floating electrodes TEd may be blackened by performing an oxidation process for a predetermined period of time. In the process of blackening the upper surfaces of the sensing electrodes RE and the driving electrodes TE, the applied third conductive metal layer BL may be first patterned and then oxidized and blackened, or the third conductive metal layer BL may be oxidized and blackened and then patterned. As described above, by adjusting the gap, the pattern, the line width, etc. of the blackened sensing electrodes RE including the transfer electrodes REm and transfer floating electrodes REd, and the driving electrodes TE including the signal electrodes TEm and the signal floating electrodes TEd, it is possible to adjust the luminance of the lights emitted from the emission areas EA1, EA2, EA3 and EA4 without compromising the touch detecting performance.

In concluding the detailed description, those skilled in the art will appreciate that many variations and modifications can be made to the embodiments without substantially departing from the principles of the present inventive concept. Therefore, the disclosed embodiments of the inventive concept are used in a generic and descriptive sense only and not for purposes of limitation.

What is claimed is:

1. A touch detection device comprising:
a first touch insulating layer;
a connection electrode disposed on the first touch insulating layer;
a second touch insulating layer disposed on the connection electrode;
a driving electrode disposed on the second touch insulating layer and connected to the connection electrode through at least one touch contact hole; and
a sensing electrode disposed on the second touch insulating layer and spaced apart from the driving electrode,
wherein at least one of the driving electrode and the sensing electrode includes a conductive metal electrode and a metal oxide electrode,
wherein the metal oxide electrode is oxidized,
wherein the sensing electrode comprises a transfer electrode for transferring a voltage equal to an amount of charges stored at touch nodes formed where the driving electrode or the connection electrode overlaps the sensing electrode, and transfer floating electrodes separated from the transfer electrode and maintained in a floating state.

2. The device of claim 1, wherein the metal oxide electrode is disposed on the conductive metal electrode,
wherein the metal oxide electrode includes one of copper oxide (CuO) and chromium oxide (CrO) or an alloy thereof, and
wherein the metal oxide electrode is blackened via to an oxidation process.

3. The device of claim 2, wherein the at least one of the driving electrode and the sensing electrode is formed in a mesh pattern not to overlap emission areas.

4. The device of claim 3, further comprising:
a third touch insulating layer disposed on the driving electrode and the sensing electrode; and
a color filter layer disposed on the third touch insulating layer to overlap the emission areas.

5. The device of claim 3, wherein a line width of the driving electrode is greater than line widths of the sensing electrode and the connection electrode.

6. The device of claim 5, wherein the driving electrode comprises:

a signal electrode electrically connected to the connection electrode to receive a touch driving signal; and
signal floating electrodes spaced apart from the signal electrode and maintained in the floating state.

7. The device of claim 6, wherein distances between the signal electrode and the signal floating electrodes are uniform, and
wherein the signal floating electrodes are formed in a square, rectangular, or a polygonal shape.

8. The device of claim 3, wherein line widths of the driving electrode and the sensing electrode are greater than a line width of the connection electrode, and the line width of the driving electrode is equal to or different from the line width of the sensing electrode.

9. The device of claim 1, wherein distances between the transfer electrode and the transfer floating electrodes are uniform, and
wherein the transfer floating electrodes are formed in a square, rectangular, or a polygonal shape.

10. A display device comprising:
a display panel comprising a display area having pixels for displaying an image;
a touch detector overlapping the display area and comprising a touch sensing area having touch electrodes; and
a touch driver electrically connected to the touch electrodes,
wherein the touch detector comprises:
a first touch insulating layer;
a connection electrode disposed on the first touch insulating layer;
a second touch insulating layer disposed on the connection electrode;
a driving electrode disposed on the second touch insulating layer and connected to the connection electrode through at least one touch contact hole; and
a sensing electrode disposed on the second touch insulating layer and spaced apart from the driving electrode,
wherein at least one of the driving electrode and the sensing electrode includes a conductive metal electrode and a metal oxide electrode,
wherein the metal oxide electrode is oxidized,
wherein the sensing electrode comprises a transfer electrode for transferring a voltage equal to an amount of charges stored at touch nodes formed where the driving electrode or the connection electrode overlaps the sensing electrode, and transfer floating electrodes separated from the transfer electrode and maintained in a floating state.

* * * * *